United States Patent [19]
Grossman et al.

[11] Patent Number: 5,889,799
[45] Date of Patent: *Mar. 30, 1999

[54] METHOD AND SYSTEM FOR OPTIMIZATION OF TELEPHONE CONTACT CAMPAIGNS

[75] Inventors: Harry Grossman, Rockville; Leroy F. Simmons, Pasadena, both of Md.

[73] Assignee: Centerforce Technologies, Inc., Bethesda, Md.

[*] Notice: The term of this patent shall not extend beyond the expiration date of Pat. No. 5,436,965.

[21] Appl. No.: 834,131

[22] Filed: Apr. 14, 1997

Related U.S. Application Data

[63] Continuation of Ser. No. 486,577, Jun. 7, 1995, Pat. No. 5,621,790, which is a continuation-in-part of Ser. No. 152,060, Nov. 16, 1993, Pat. No. 5,436,965.

[51] Int. Cl.⁶ .................................................. A04M 11/00
[52] U.S. Cl. ..................... 379/266; 379/265; 379/309; 379/93.12
[58] Field of Search ............................ 379/265, 266, 379/309, 201, 142, 93.12

[56] References Cited

U.S. PATENT DOCUMENTS

| | | | |
|---|---|---|---|
| 3,989,899 | 11/1976 | Norwich | 179/2 |
| 4,599,493 | 7/1986 | Cave | 379/247 |
| 4,829,563 | 5/1989 | Crockett et al. | 379/309 |
| 4,833,618 | 5/1989 | Verna et al. | 379/107 |
| 4,858,120 | 8/1989 | Samuelson | 379/309 |
| 4,881,261 | 11/1989 | Oliphant et al. | 379/215 |
| 4,933,964 | 6/1990 | Girgis | 379/67 |
| 5,053,970 | 10/1991 | Kiruhara et al. | 364/468 |
| 5,111,391 | 5/1992 | Fields et al. | 364/401 |
| 5,151,932 | 9/1992 | Arizumi et al. | 379/106 |
| 5,153,909 | 10/1992 | Beckle et al. | 379/265 |
| 5,155,761 | 10/1992 | Hammond | 379/67 |
| 5,155,763 | 10/1992 | Bigus et al. | 379/113 |
| 5,164,893 | 11/1992 | Brown et al. | 379/265 |
| 5,164,983 | 11/1992 | Brown et al. | 379/265 |
| 5,179,589 | 1/1993 | Syu | 379/265 |
| 5,185,782 | 2/1993 | Srinivasan | 379/67 |
| 5,197,000 | 3/1993 | Vincent | 364/401 |
| 5,297,195 | 3/1994 | Thorne et al. | 379/93 |
| 5,343,518 | 8/1994 | Kneipp | 379/265 |
| 5,436,965 | 7/1995 | Grossman et al. | 379/266 |
| 5,621,790 | 4/1997 | Grossman et al. | 379/266 |

OTHER PUBLICATIONS

J. Holmgren, Greater Productivity With AT&T Outbound Call Management, AT&T Technology, May 1990.

P. Kneisel, Making Light of Dialing Drudgery, Inbound/Outbound Magazine, pp. 42–45, Aug. 1989.

M.P. Heller, Dialing Up Debtors, Inbound/Outbound Magazine, pp. 22–26, Sep. 1989.

*Primary Examiner*—Daniel S. Hunter
*Attorney, Agent, or Firm*—Morgan, Lewis & Bockius LLP; C. Scott Talbot; Robert J. Goodell

[57] ABSTRACT

A system and a method of generating outbound telephone contact campaigns optimized to contact the maximum number of targeted individuals during a campaign using a predictive dialer system, telephone operators with computer consoles and stored account records, where each account is associated with an individual with one or more telephone numbers and a history of attempts to contact the individual associated with each account.

12 Claims, 15 Drawing Sheets

METHOD AND SYSTEM FOR OPTIMIZATION OF TELEPHONE CONTACT CAMPAIGNS

CROSS-REFERENCE TO RELATED APPLICATION

This is a continuation of application Ser. No. 08/486,577 filed on Jun. 7, 1995 U.S. Pat. No. 5,621,790, which is a continuation-in-part of application Ser. No. 08/152,060 filed Nov. 16, 1993 and issued as U.S. Pat. No. 5,436,965.

BACKGROUND OF THE INVENTION

The present invention relates generally to the fields of data processing and telecommunications and, more particularly, to a system for the optimization of telephone contact campaigns by increasing the probability that an attempt to contact a party will be successful.

Telephone communication has become ubiquitous in contemporary society with the nearly universal availability of telephones. The telephone provides a fast and efficient means for contacting someone any time of day or night anywhere in the country or even the world. However, telephone communications only work if the person you are trying to contact answers the telephone. If that person is unavailable and the call is unanswered or someone else answers, the call is wasted. The caller has to either call again later or, if a message was left, wait for the person called to call back. In those situations where the person called is unlikely to return the call, such as telemarketing or dunning delinquent debtors for debt collection purposes, establishing contact with the desired party in the first instance is often the only way to make a connection.

Where a large number of people need to be contacted on a daily basis, e.g., debt collection or telemarketing, automated outbound dialing systems are used to expedite the contacting of as many people as possible by telephone in a limited time period. There are three basic components to an automated outbound dialing system. First, there is a computer in which a database containing the data records is stored. Second, there is an automated dialer into which the telephone numbers are downloaded from the host computer for automated dialing. Third, there are human operators to talk to the people contacted.

A set of telephone numbers are normally selected from a database in the computer and downloaded directly into the automated dialer before the start of the work day. As soon as the human operators arrive and are ready to talk, the automated dialer begins dialing and proceeds to take the appropriate action as the telephone calls are answered. The appropriate action usually consists of transferring the line to a human operator. Relevant information associated with the person called is displayed on a computer terminal viewed by the human operator and the operator responds by either conveying information to or obtaining information from the person contacted. The operator then "wraps up" the telephone call, making whatever entries are necessary on the computer terminal while viewing an account record on the computer terminal. In those cases where the telephone call is unanswered, a record of the unsuccessful attempt is made by the automated dialer.

For example, the personal records of delinquent debtors could be selected from the database of all customers and downloaded from a mainframe computer system to be dunned on a Tuesday morning. The delinquent debtors' telephone numbers would be downloaded directly into an automated dialer and, if the telephone call is answered, the line will be transferred to an operator viewing the debtor's credit history and other information. The operator speaks to the debtor or the debtor's spouse regarding the delinquency. The operator then wraps up the telephone call by entering a record of the action on the computer terminal. A record of the call is made by the automated dialer, the account record is updated and the operator responds to the next call.

However, frequently the call is not answered or the individual answering the telephone is not the person with whom contact is desired but is instead someone else, a "wrong party contact." The desired individual may be at work (and the number dialed is the person's home telephone number) or the person may simply be out when the call is made. The fact that most people may be reached at two telephone numbers, a work number during the day and a home number in the morning and evening, decreases the likelihood of calling the telephone number where the desired individual can be found. This problem of calling a telephone number when the person to be contacted is not there is more significant when an extensive geographic area encompassing several time zones is covered in a single day from one teleprocessing center. These problems result in a significant waste of resources making wrong party contacts that needlessly irritate the person answering the telephone and reduce the useful productivity of each individual operator. Operators in outbound dialing environments often spend half their time on unproductive wrong party contacts.

Predictive dialers have been developed to increase efficiency in automated outbound dialing systems. Telephone numbers are dialed at a rate designed to keep the human operators constantly busy without leaving answered calls on hold until a human operator is available (so-called nuisance calls). U.S. Pat. Nos. 4,599,493, 4,829,563, 4,881,261, 4,933,964, and 5,179,589 show various methods for enhancing predictive dialing. Although predictive dialers have proved useful in minimizing the time an operator is idle between calls, they have proved ineffective at reducing the wasted time operators spend on wrong party contacts.

Predictive dialer systems typically do not perform an analysis of relative call priority, times of increased likelihood of contacting the desired individuals and performance-based predictions of available resources. Contact attempts are essentially made randomly, without discriminating between low and high priority contact attempts. In addition, predictive dialers are unable to address staffing problems, resulting in too few operators during peak contact times; operators wasting time on inefficient contact attempts or operators wasting time on wrong party contacts during those times of day when the persons being called are unlikely to answer the telephone. These problems of wrong party contacts, unsorted and unsortable dialer-downloads and suboptimal staffing were simply not addressed until the invention of the campaign optimizer.

SUMMARY OF THE INVENTION

The present invention addresses the problems of wrong party contacts and limited resources by scheduling individual call attempts to maximize the likelihood of right party contacts, maximize the productivity of each operator and account for the distribution of available staffing resources throughout each day of the week. Optimized campaigns reduce the number of wrong party contacts and achieve heightened levels of productivity by predicting when telephone contact attempts are most likely to be successful and/or which telephone contact attempts will result in maximum operator productivity. In particular, operator productivity may be maximized by optimizing the number of right-party contacts per operator-hour. Furthermore, by providing a mechanism for segmenting the daily workload and allowing for midday corrections, changes in staffing resources or call priorities can be compensated for during the day. By determining an optimal distribution of work (call attempts) throughout the work day, the present invention also provides guidance on allocating staff resources so as to maximize the number of right party contacts per paid hour.

Account records are stored in a database stored in a host computer, each of which is associated with an individual to be contacted. Although a single individual may be associated with one or more account records, the contact probability information for that individual typically remains consistent, irrespective of the number of accounts associated with that individual, because individual contact probability information is maintained separately from the account records. At regular intervals, normally every night before a workday, a set of accounts to be processed is selected for downloading from the host computer. Each account record includes information about the person to be contacted, including a unique identifier such as a social security number, as well as home and work telephone numbers and information relating to account selection criteria, campaign optimization and the information viewed by a human operator when the individual is contacted.

A set of accounts selected for teleprocessing comprises a host-download. A host-download is essentially an unordered set of account records that normally include the telephone number where an individual associated with the account may be contacted. Prior to this invention, unoptimized host-downloads have simply been downloaded directly from the host computer system to an automated predictive dialer system for teleprocessing.

The set of accounts selected for processing is either downloaded from a host computer system directly to the campaign optimizer system or passed through a predictive dialer system to the campaign optimizer system. The account records of the host-download are sorted and relative teleprocessing priorities of the individual accounts are determined. The sorted and prioritized account records are then temporarily saved in a master campaign file from which the separate campaigns will be generated.

A contact history database record for each individual is stored in the campaign optimizer system. This contact history database retains a record of all attempts, successful and unsuccessful, to contact the individuals associated with the accounts. These contact history records, in conjunction with behavioral models reflecting predicted behavior, are used to determine the best time to call the targeted individuals based on the relative probability of contacting that individual (i.e., making a "right party contact"). A call vector is constructed for each individual's telephone number and the sorted and prioritized account records of the master campaign file are then merged with the associated call vectors.

There are situations where campaign optimization is not achieved by maximizing the ratio of right party contacts to contact attempts because an excessive time is required for each right party contact. For example, a right party contact where the targeted individual is at work often takes significantly longer than a right party contact when the targeted individual is at home because the targeted individual may be answering other calls or the call may be initially answered by a secretary or receptionist. In these situations, campaign optimization is achieved by maximizing operator productivity, i.e. the number of right party contacts per operator-hour, instead of the ratio of right party contacts to contact attempts. A call vector that incorporates call time data, in addition to or instead of just contact probability data, may then be used. In general, it is preferable to maximize operator productivity instead of the ratio of right party contacts to contact attempts.

The augmented accounts are then separated into optimized campaigns. Optimized campaigns are essentially a chronological schedule of attempts to contact targeted individuals. The attempts may be scheduled for when each targeted individual is most likely to answer the telephone as long as there are dialer resources available to make the call at that time or they may be scheduled in accordance with other criteria. If there are not enough dialer resources to attempt contact at the time of highest probability of contacting the right party or maximum operator productivity, then the attempt is scheduled to be made at the time of next highest right party contact or optimal operator productivity. High priority accounts are scheduled before low priority accounts to ensure that attempts to contact high priority accounts are made at the time of highest probability of right party contact and/or operator productivity. The optimized campaigns are typically of fixed durations, normally varying from one to four hours (half-day). Each optimized campaign is then downloaded into a predictive dialer for teleprocessing.

The actual telephone contact campaign begins when the predictive dialer begins making contact attempts, a contact attempt consisting of dialing the telephone number. If an attempt produces a "connect," (i.e. the telephone is answered), then the line is transferred to an available operator for further processing.

Relevant information associated with the account is displayed on a computer terminal viewed by an operator when the call is answered and transferred to the operator. The operator takes whatever action is appropriate, depending on the purpose of the call and whether a right party contact or wrong party contact has been made. A right party contact occurs if the targeted individual or a close relative of the targeted individual (i.e., spouse) answers the telephone or is persuaded to talk to the operator. A wrong party contact occurs if an answering machine or another individual answers the telephone and the targeted individual is unavailable or unwilling to speak to the operator. The operator then wraps up the call, inputting a report on the outcome of the attempt into the computer terminal. The account record and the contact history database are flagged for updating and the operator responds to another call.

At any point in the day, such as during lunch, the campaign optimizer can reprocess campaigns for the remainder of the day, reassessing the probabilities of right party contacts and reassigning priorities. This recalculation provides an opportunity to accommodate changing circumstances (i.e. changed priorities because of external events), an opportunity to schedule second contact attempts for high priority accounts and a way to effectively compensate for staffing changes. For example, a targeted individual with a very high priority can be selected for subsequent attempts following an unsuccessful earlier attempt, despite low contact probabilities. The campaign optimizer can also generate staffing information that provides guidance as to the optimal number of operators needed for the remainder of that day's campaigns.

The campaign optimizer system is not necessarily limited to telephone campaigns. The campaign optimizer could easily provide guidance for optimal door-to-door contact campaigns, providing rosters and associated addresses instead of dialer downloads. By refocusing the optimal contact analysis on days rather than hours and appropriately varying the definition of a successful or right party contact, the campaign optimizer could also be used to optimize a direct mail campaign.

DETAILED DESCRIPTION

Figure 1:
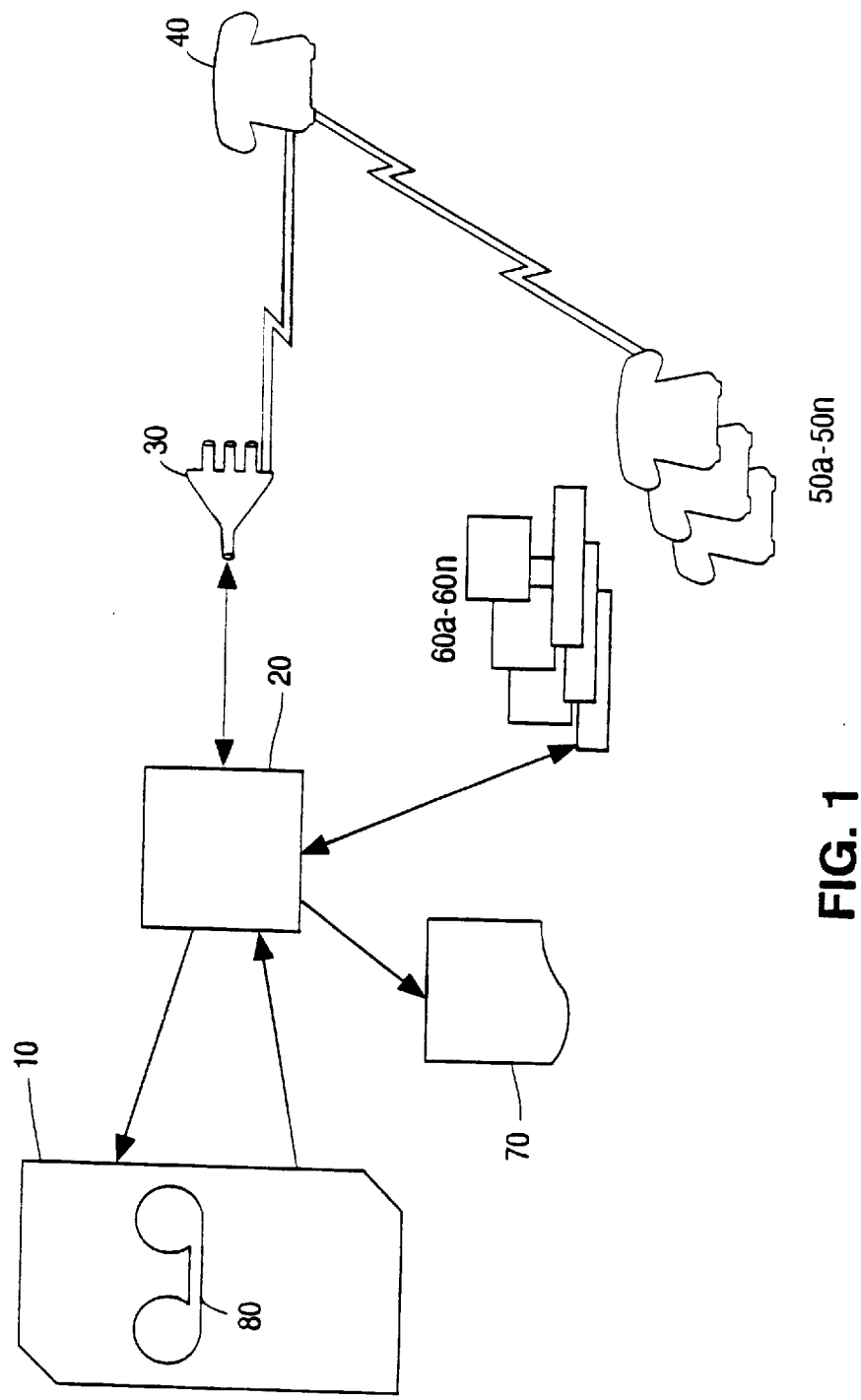
FIG. 1 is a schematic representation of a complete system configured in accordance with the principles of the invention.

FIG. 1 schematically illustrates a preferred embodiment of the present invention. Host computer 10 maintains a database 80 of account records and selectively downloads a set of account records for teleprocessing to campaign optimizer 20. Campaign optimizer 20 may be operated on a UNIX workstation interfaced between host computer 10 and predictive dialer system 30.

The relative processing priorities of the downloaded account records are assessed in campaign optimizer 20 and the account records are then grouped into priority bands corresponding to specified ranges of account processing priority values. The prioritized account records are sorted and merged with individual contact history records. The individual contact histories, in conjunction with behavior models, are used to generate telephone contact campaigns. Each telephone contact campaign comprises a chronologically ordered set of attempts to contact targeted individuals. The chronological order is based on a descending order of priority, the right party contact probabilities for each targeted individual and the availability of staffing resources on an hourly basis.

Dialer-downloads are transmitted to predictive dialer system 30 for teleprocessing. Each dialer-download (comprising a single campaign) is designed to be run during a specific time interval. The number of accounts in each campaign is based on available resources, including the number of operators available for each predictive dialer during the time interval and the forecasted performance predictions, such as utilization. The predictive dialer system attempts to contact the targeted individuals associated with the selected account records at the times determined by campaign optimizer 20.

If a contact attempt made by predictive dialer system 30 results in a connection with remote telephone 40, the telecommunication line is transferred from predictive dialer system 30 to one of local telephone operators arbitrarily labeled 50a–50n. Associated with each of the operators is one of the computer terminals arbitrarily labeled 60a–60n. Account information corresponding to the individual targeted at remote telephone 40 is displayed on computer terminal 60x associated with the operator at local telephone 50x which is connected to telephone 40. The operator determines if a wrong party contact or right party contact has been made and proceeds appropriately, generally by communicating the information displayed on computer terminal 60x if a right party contact was made. The operator then wraps up the attempt by recording the outcome of the contact on computer terminal 60x.

The results of the contact attempts are transmitted from computer terminals 60a–60n and predictive dialer system 30 to campaign optimizer 20 where the results are used to update the contact history database stored therein. These results are also used to update account records in database 80 stored in host computer system 10 when necessary, such as when the telephone numbers have changed.

Campaign optimizer 20 also generates staffing information 70 indicating the "ideal" number of operators for each campaign as well as reporting operating statistics. Staffing information 70 includes a recommendation based upon the performance predictions and is distinct from an optimized campaign in which the number of attempts to be made at any particular time is limited by the number of available predictive dialers and operators.

Figure 2A:
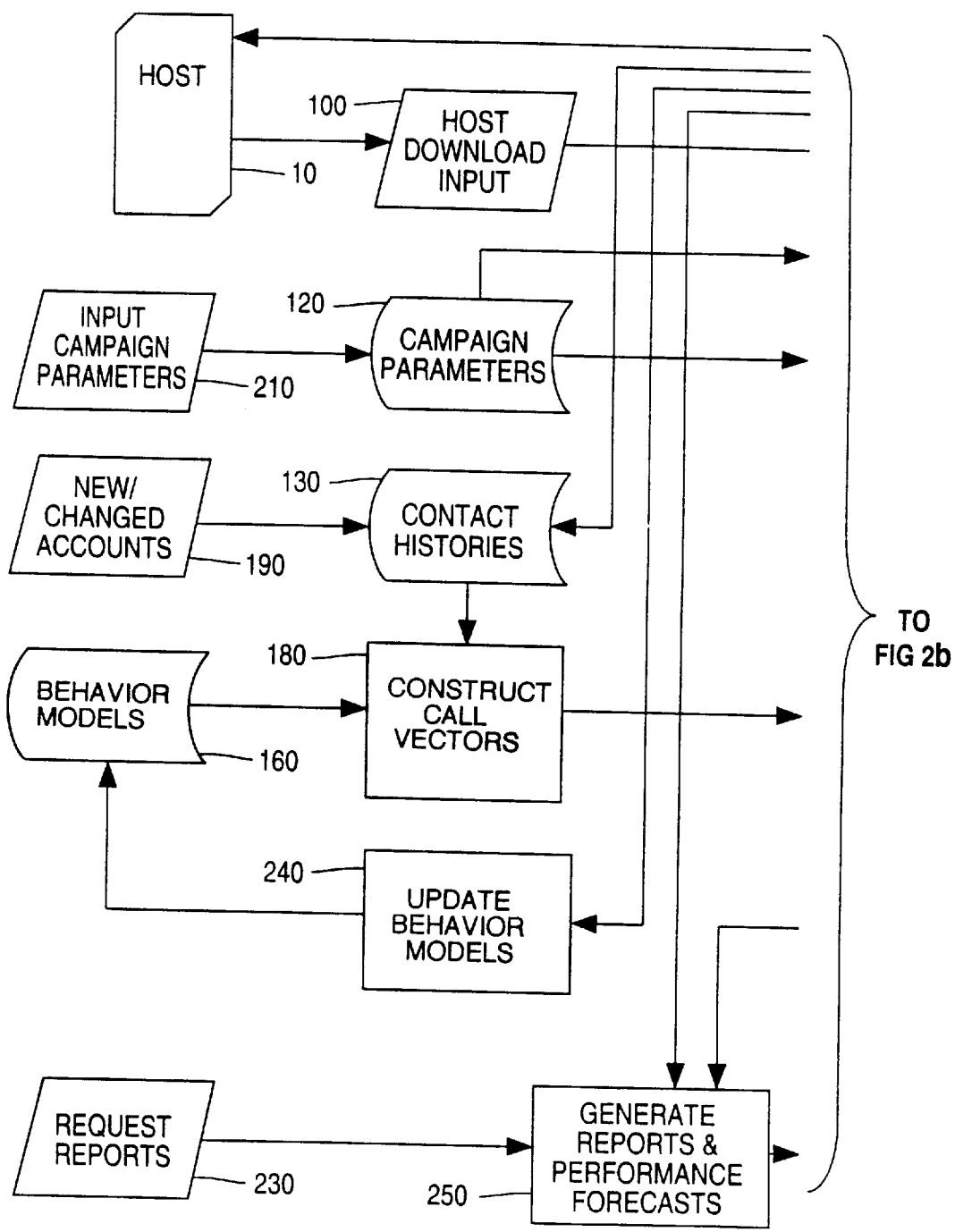
FIG. 2a–2b are a schematic work flow diagram showing an overview of telephone contact campaign optimization.
Figure 2B:
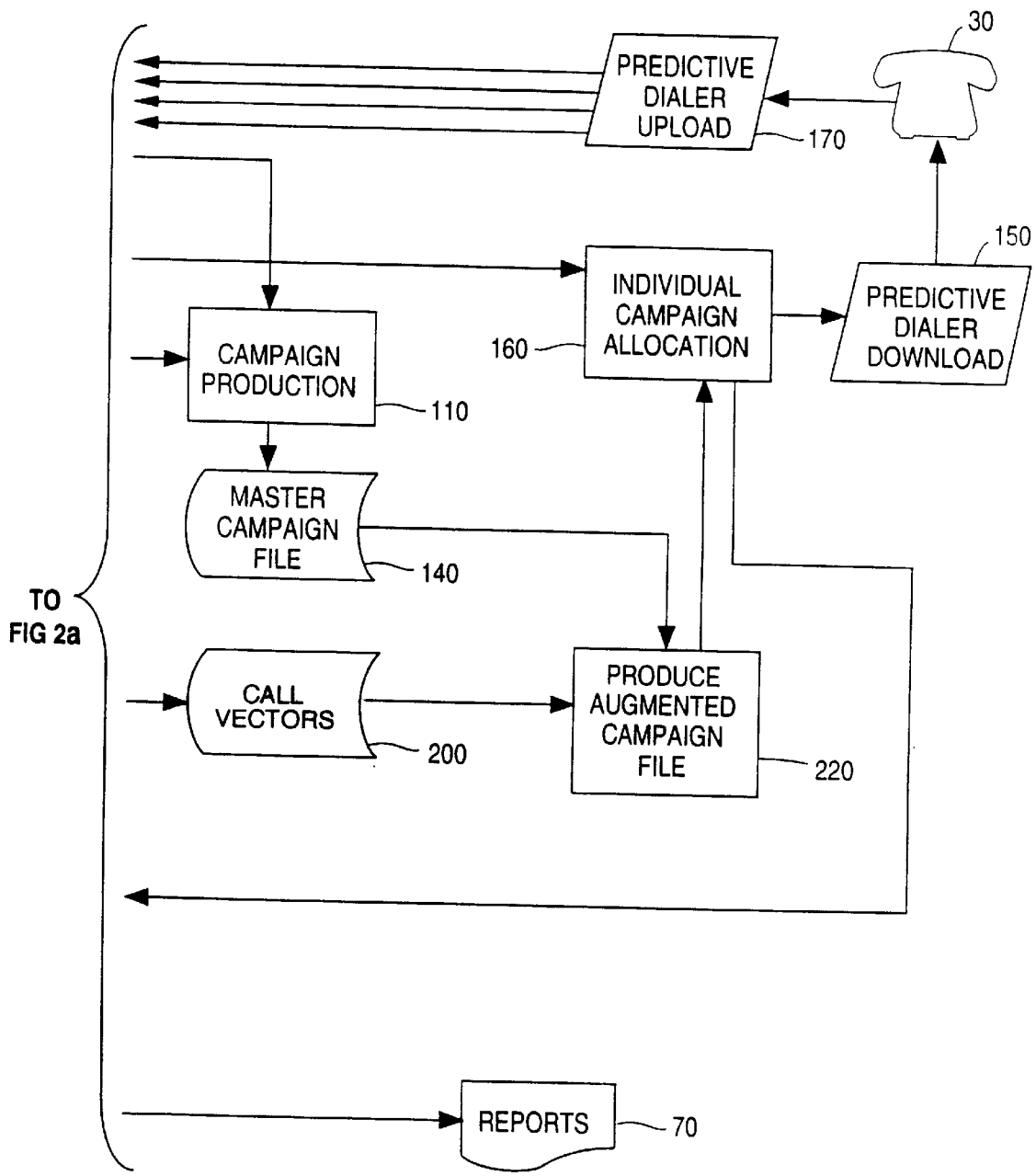

Referring to FIG. 2, the process of telephone contact campaign optimization begins when a set of accounts are transmitted from host computer system 10. The transmitted accounts (host-download) are translated into a useable format, if necessary, and input to the campaign optimizer at input stage 100. Standard UNIX utilities (such as ftp, cron and awk) are used to establish and maintain communications and perform any desired data translation.

Figure 5A:
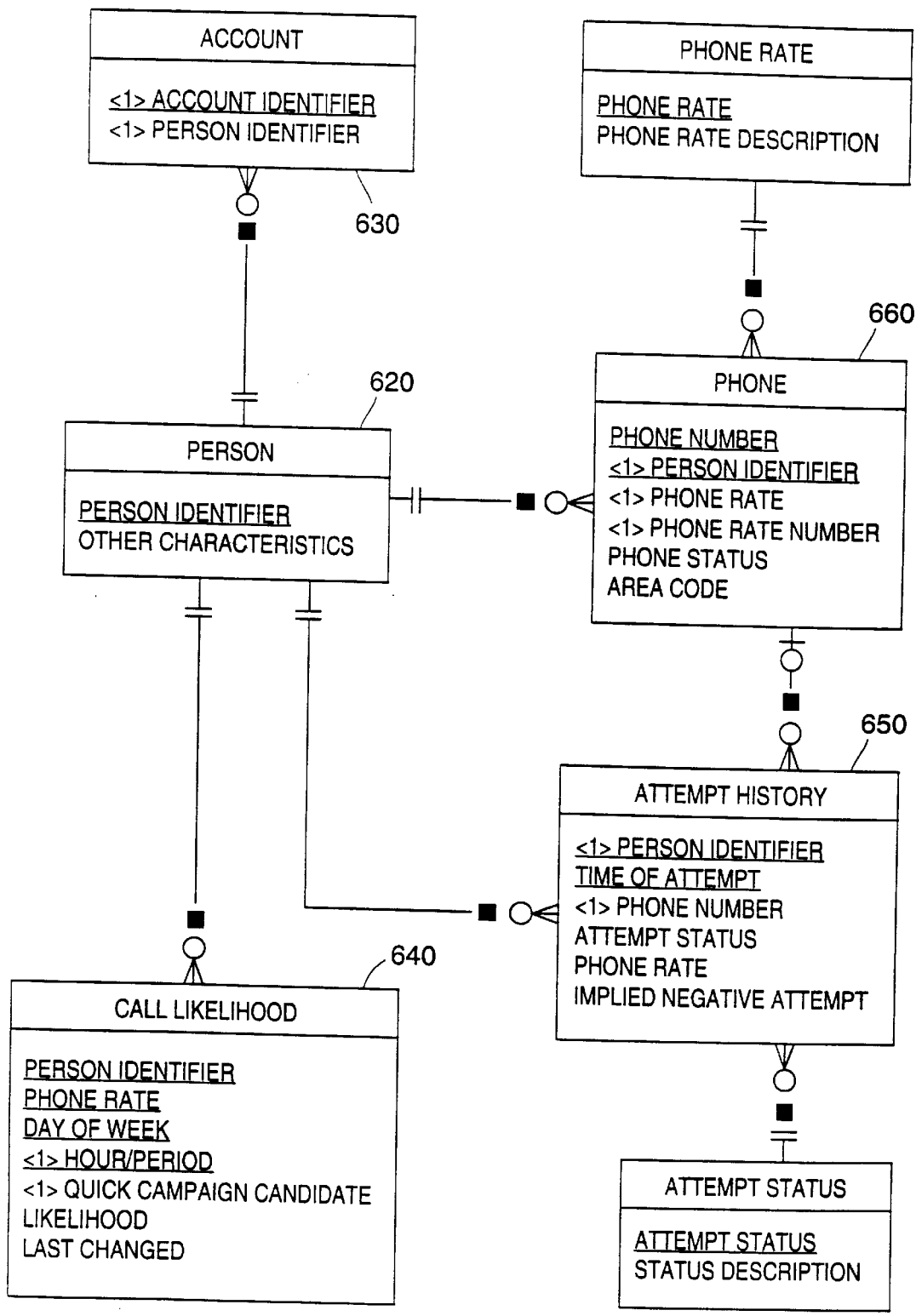
FIG. 5a is a database schematic of an account record.

The accounts of the host-download are processed into one or more campaigns at 110. The present invention uses software written in C and C++ programming languages to perform the needed processing. The processing priority of the host-download accounts is determined in accordance with the processing priority parameters of campaign parameters 120. Campaign parameters may be uniquely varied for each campaign or workday and are input by a campaign administrator at 210. The accounts are also sorted by an identifier within the account record, (e.g., the social security number of the individual associated with the account) at 110. For example, the data field "Person Identifier" represents the identifier in the present embodiment. Referring to FIG. 5a, Person Identifier is found in Person 620, Account 630, Call Likelihood 640, Attempt History 650, and Phone 660 and provides a link associating these disparate data elements to a targeted individual.

Certain account records are characterized as "must attempt" records. These accounts are not necessarily prioritized and sorted in the same manner as the remainder of the records and are segregated at 110. The normally sorted and prioritized account records and the "must attempt" records are saved as master campaign file 140.

The master campaign file 140 is an intermediate step in the campaign optimization process wherein relative prioritization has been established but chronological scheduling has not yet been performed. Chronological scheduling accounts for temporal variations in either the likelihood of contacting the targeted individual or operator productivity that are represented by call vectors 200.

Call vectors 200 are constructed from individual contact histories 130, behavior models 160 at and, if desired, operator productivity data, at 180. Contact histories 130 reflect the outcome of previous attempts to contact a targeted individual that are maintained using predictive dialer 30 data uploaded into the campaign optimizer at 170 and new or changed information downloaded from host computer system 10 at 190. Contact histories 130 may be maintained, for example, as two 7×13 arrays for each individual, each array recording contact attempts for seven days of the week. The first array represents a work telephone number and the second array represents a home telephone number. Operator productivity data reflects the amount of operator time an attempt is likely to require.

Behavior models provide data for those time intervals for which there is no contact history available, perhaps because no attempts to contact the targeted individual have been made at that time on that day. The behavior models represent expected behavior patterns generally indicative of right party contact probabilities. Six sets of behavior models are typically maintained, three sets of morning, midday and evening behavior models for home telephone numbers and three sets of morning, midday and evening behavior models for work telephone numbers.

Call vectors 200 may reflect either contact probability or maximum operator productivity. Call vectors 200 are produced by processing the individual contact histories 130 along with selected behavior models 160 that most closely correspond to the individual contact history. Call vectors 200 are normally produced or updated before the host-download preceding telephone contact campaigns. This is necessary to ensure that the required processing can be completed in a timely fashion so as to not delay commencement of a telephone contact campaign at the start of a workday. This is particularly important because of the high contact probabilities and operator productivity normally associated with early morning hours.

Call vectors 200 are merged with master campaign file 140 at 220 to create an augmented campaign file. The master campaign file 140 and call vectors 200 file are both sorted on an identical identifier found in both files in the present embodiment, simplifying and accelerating the merger process.

The augmented campaign file, representing, for example, an entire day's worth of accounts to be contacted, is then converted into individual campaigns at 160. Individual campaign size is determined by available resources based on campaign parameters 120 and performance forecasts. If the probability of right party contact is being optimized then the accounts are scheduled, in descending order of priority, for contact attempts at the time of highest contact probability for which dialer capacity exists at 160. Alternatively, if operator productivity is being optimized, then the accounts are scheduled, in descending order of priority, for contact attempts at the time of highest operator productivity for which dialer capacity exists at 160. After this process is completed and the individual campaigns have been constructed, the "must attempt" accounts are then scheduled for contact attempts. If there is no remaining available dialer capacity, a low priority contact attempt will be "bumped" from the day's campaigns to ensure that an attempt to contact the individual associated with the "must-attempt" account is made. Campaigns are then transformed into a format usable by predictive dialer system 30 (dialer-downloads) and downloaded to the predictive dialer system 30 at 150.

A series of campaigns for an entire workday may be constructed from the initial host-download received from host computer system 10. However, the campaign optimizer can also optimize campaigns for shorter and longer periods, including half of a work day. In particular, the campaign optimizer can receive campaign results from dialer-upload 170 and campaign parameters 210 before or during a midday break (lunch). The campaign optimizer can then reschedule the campaigns for the remainder of the day, accommodating unexpected resource changes (less operators or broken predictive dialers) and rescheduling high-priority attempts which resulted in wrong-party contacts in the morning. In addition, contact attempts may be removed from the schedule for a variety of reasons, including changed priorities or contact initiated by the targeted individual, thereby obviating the need for a repetitive contact. Furthermore, an operator may have been informed that a targeted individual will be available at a later time and it would be highly desirable to schedule a contact attempt at that time.

Each campaign produced by the campaign optimizer represents an optimal utilization of available resources. The optimal utilization may be the maximum number of right party contacts, the maximum productivity of each operator in terms of the number of right party contacts per operator hour, the maximum number of contact attempts made per unit time or a combination thereof. The available resources and other relevant parameters (e.g., start and finish times) for each individual campaign are input by a campaign administrator at 210. These campaign parameters are accepted by the campaign optimizer and translated into a useable format at 210 and saved at campaign parameters 120. Campaign parameters are primarily maintained as tables designed to be configured by a campaign administrator manipulating the parameters through a graphic interface such as X-Windows at 210.

Campaign parameters are entered using seven separate tables in the described embodiment. The first table is the priority scoring table used to determine the relative weight of values used in determining processing priority of the accounts. Processing priority is initially assessed using numeric fields in the downloaded accounts. Every numeric field in a downloaded account may be used for determining processing priority and has an associated weighting function. Each weighting function operates on the value of the corresponding field to compute the field priority value. The individual account priority value used to assign priority is the sum of the individual field priorities.

Figure 5B:
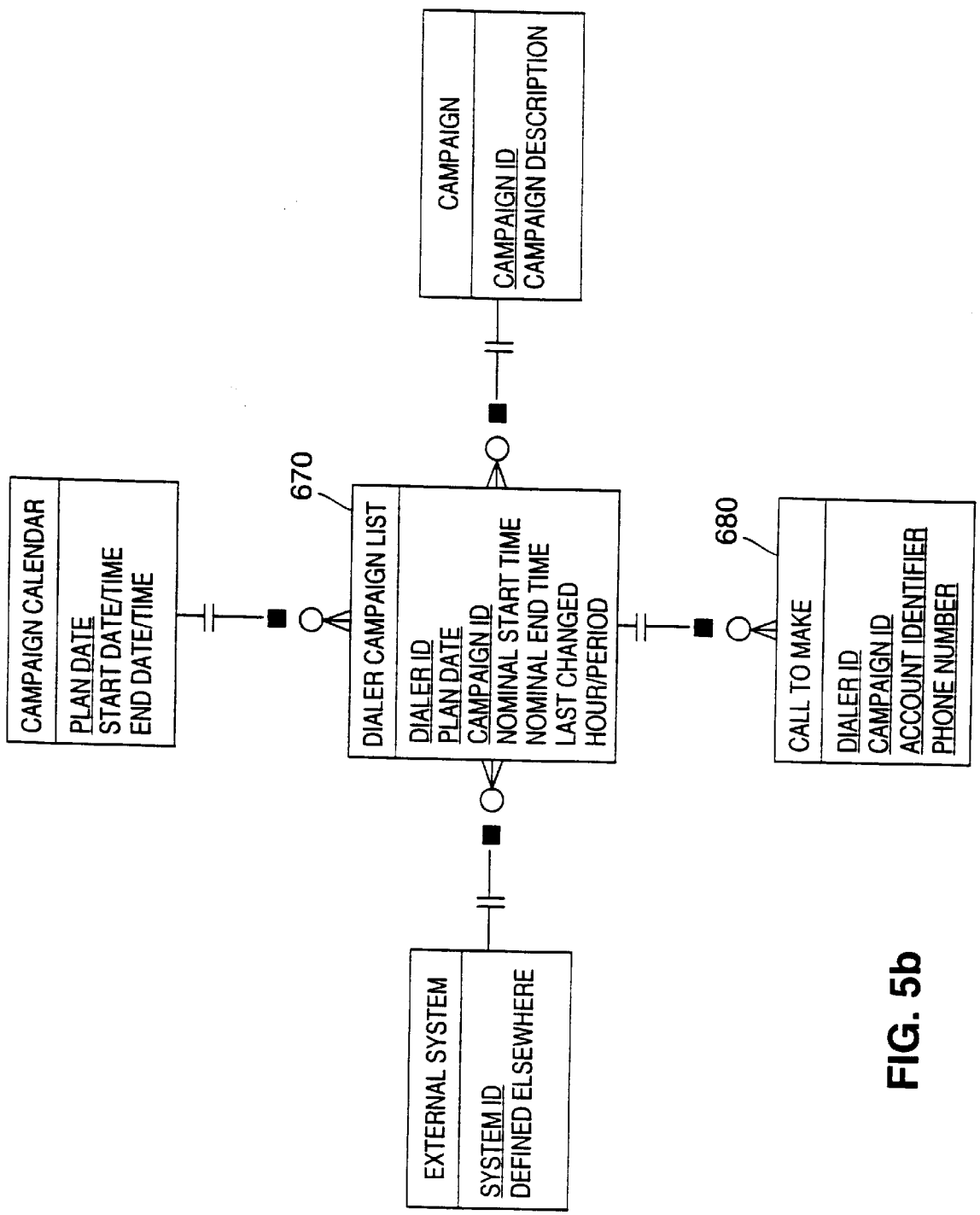
FIG. 5b is a database schematic of a campaign list.
Figure 5C:
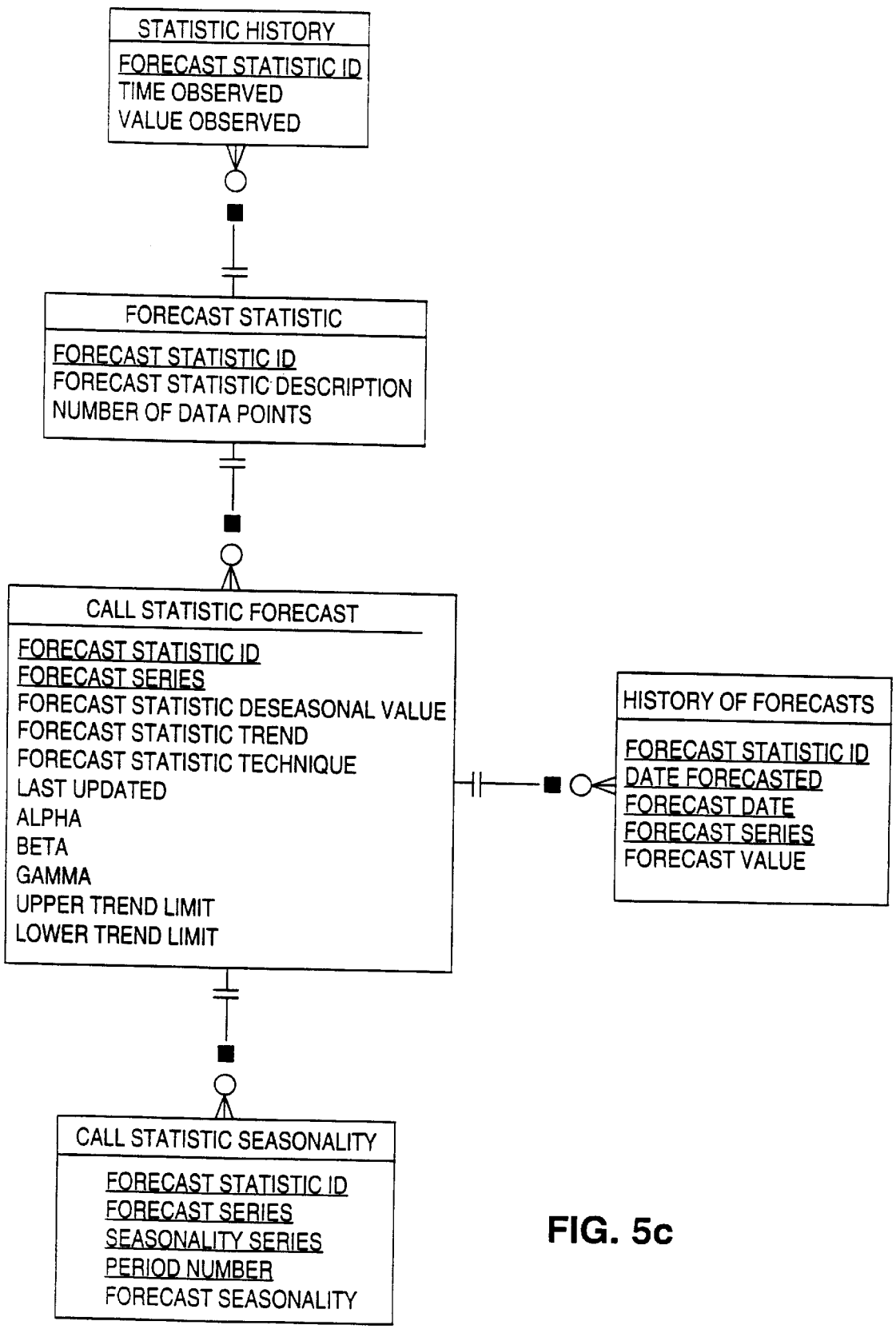
FIG. 5c is a database schematic of a schedule statistics record.
Figure 5D:
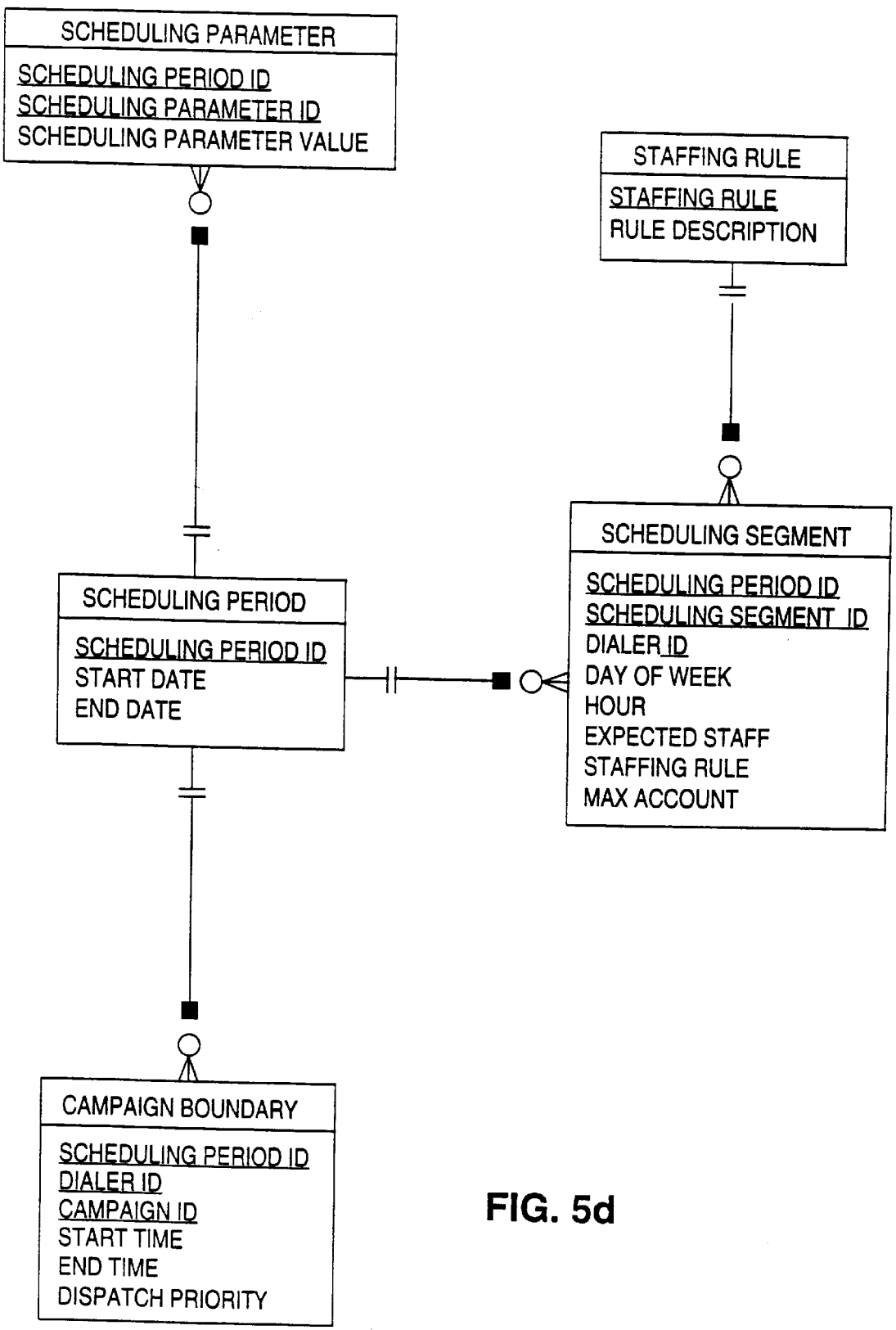
FIG. 5d is a database schematic of a schedule parameters record.
Figure 5E:
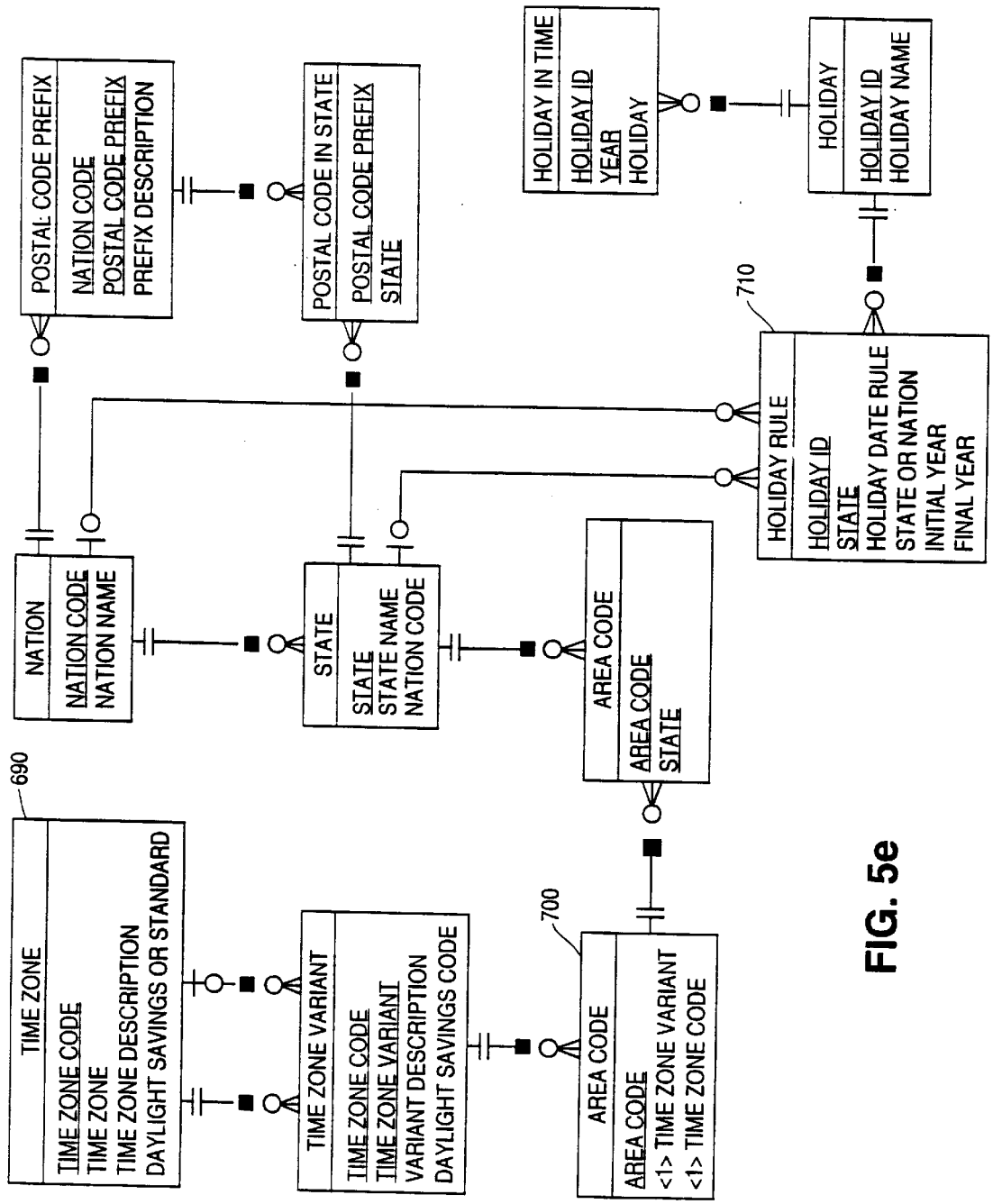
FIG. 5e is a database schematic of an area code classification record.
Figure 5F:
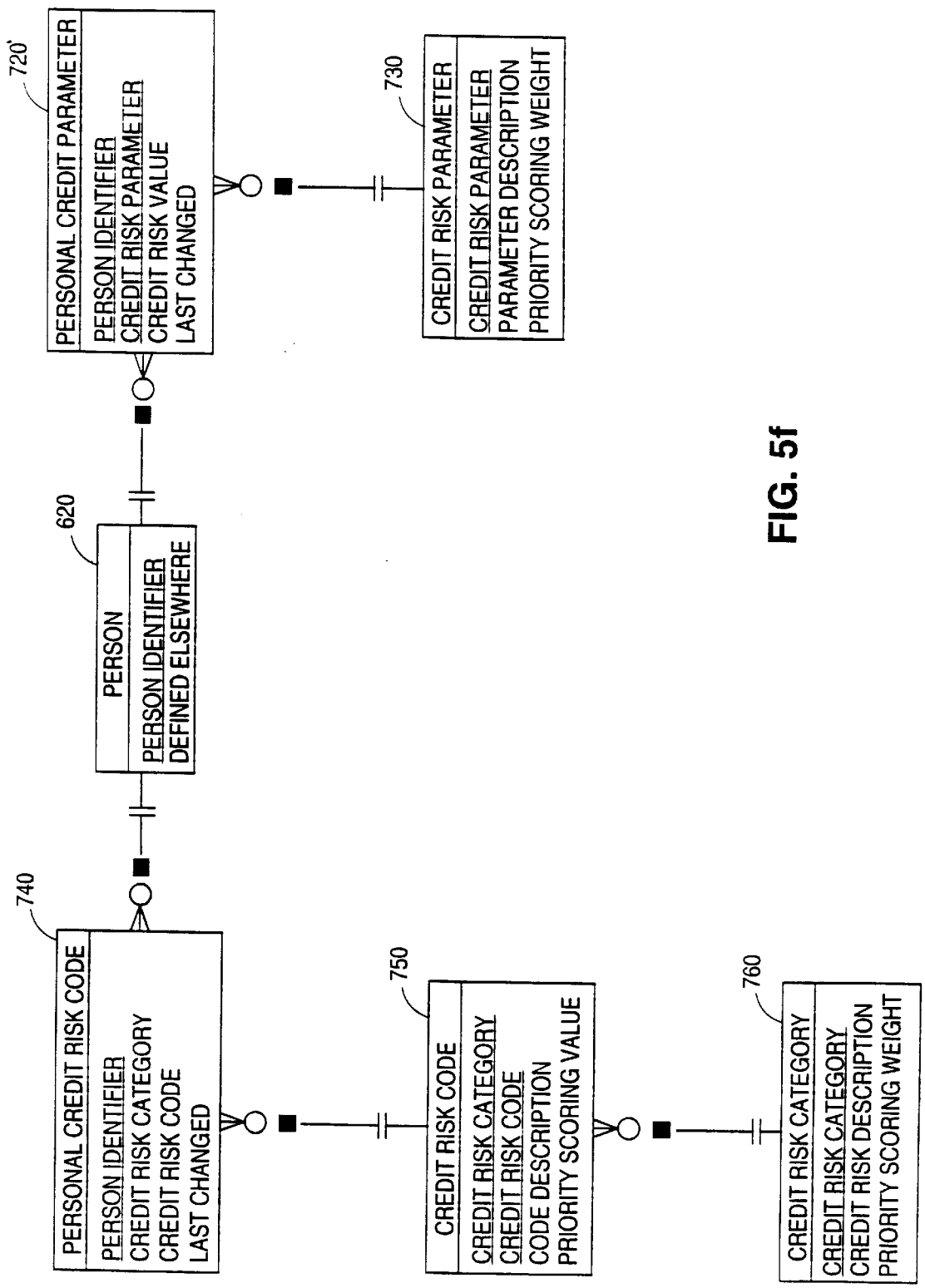
FIG. 5f is a database schematic of a credit risk parameters record.

For example, FIG. 5f schematically describes various data records used for determination of processing priority in the present embodiment. Data units credit risk parameter 730 and credit risk category 760 include fields for "Priority Scoring Weight." These "Priority Scoring Weight" fields are used to determine the "Priority Scoring Value" in Credit Risk Code 750 and "Credit Risk Code" in Personal Credit Parameter 720. Other possible fields might be number of days delinquent and amount owed as well as a must attempt field. In a credit collections environment, these fields are generally indicative of the relative urgency of contacting an account. The priority scoring table may also have an entry for "must attempt" accounts, those accounts for which a contact attempt must be made, irrespective of contact improbability. These accounts are placed into campaigns wherever possible and will preempt other accounts if necessary because of resource limitations.

The second parameter table is the hourly staffing table in which the number of operators staffing each predictive dialer supported by the campaign optimizer is entered. The hourly staffing table information is used in the determination of various campaign parameters, including the hours during which the campaigns will be conducted, the number of accounts in each campaign and the distribution of each campaign amongst the predictive dialers. The hourly staffing table may also be implemented as a two-dimensional matrix with each row representing an hour, each column representing a predictive dialer and the number of operators at that dialer at during that hour appearing at the intersection. FIG. 5d schematically displays some of the data structures used for the hourly staffing table in the present embodiment.

The third parameter table is the external interfaces table used to interface with the various external elements, including the host computer and the predictive dialer system. The external interfaces table provides support for underlying communications and is not normally accessible through a graphics user interface. For example, this table may specify device addresses, communication protocols, pass words and specific routines to invoke to handle communications.

The fourth parameter table is the area code/time zone table. The data structures incorporated into the area code/time zone table of the present embodiment is shown in FIG. 5e. Although the campaign optimizer system operates in local time, the individuals associated with the various accounts do not necessarily live or work in the same time zone. The campaign optimizer takes this into account through the area code/time zone table which is used to translate between local time and the time where the telephone number of the account is located. The area code/time zone table also compensates for daylight savings time and holidays. The present embodiment handles holidays using Holiday Rule 710, associating Area Code 700 with the relevant state and nation. The local time, local holidays and whether and when daylight savings time is in effect, as maintained in Time Zone 690, are specified for each area code.

The fifth parameter table is the smoothing parameter table which is used for performance forecasts and contact probability determination. The campaign optimizer performance forecasts are produced by exponential smoothing for each hour of the day and each day of the week and the smoothing parameter, which determines how heavily weighted recent observations are, is in the smoothing parameter table. Performance forecasts are some of the reports 70 that can be produced by the campaign optimizer. The smoothing parameter table also holds the confidence parameters used when calculating call vectors for campaign optimization. In the present embodiment of the invention, the confidence parameter is a target number representing the number of attempts necessary to establish a reasonably reliable prediction of contact probability at a specified time.

The sixth parameter table is the system work schedule which tells the campaign optimizer when to perform various activities including downloading accounts from host computer 10 at 100, uploading predictive dialer data to host computer system 10 at 170, and downloading optimized campaigns to the predictive dialer system 30 at 150. The system work schedule may be implemented as a UNIX cron file that triggers specified processes at the desired times.

The seventh parameter table is the campaign length table. Campaigns may be as short as one hour in duration, although it is generally desirable to run longer campaigns because predictive dialers are inherently more efficient when running longer campaigns. The data elements of the campaign length table are described schematically in FIG. 5b, which also illustrates the organization and elements of dialer-downloads in Dialer Campaign List 670 and Call To Make 680.

Referring again to FIG. 2, predictive dialer system 30 provides comprehensive results of all contact attempts to the campaign optimizer system at 170, where the predictive dialer data is used by the campaign optimizer C programs for uploading to host computer system 10. The predictive dialer system data is transmitted to host computer system 10 for use in updating account records when necessary, such as when a telephone number has been disconnected or changed. The predictive dialer data is used within the campaign optimizer for contact history 130 updates and for performance predictions.

The campaign optimizer generates a variety of reports, performance forecasts and staffing projections at 250. These reports, which are, for example, printed, displayed on a video terminal, or simply archived, are available to a campaign administrator at 70.

Figure 3:
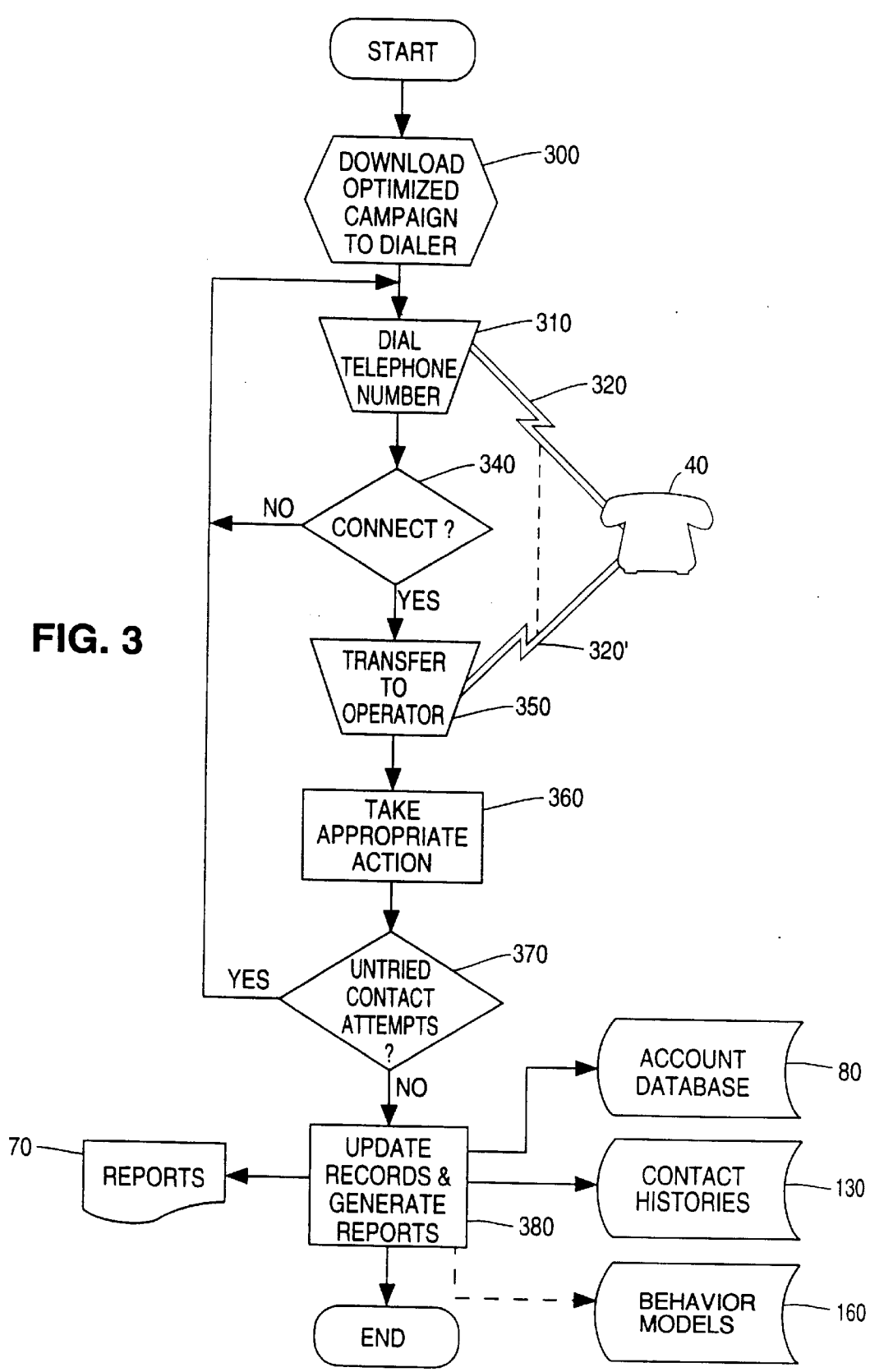
FIG. 3 is a flow chart diagram of an optimized telephone contact campaign.

FIG. 3 illustrates the conduct of an optimized telephone contact campaign. An entire day's set of optimized telephone contact campaigns is downloaded to a predictive dialer system at the start of the day, before the first of the day's campaigns is scheduled to begin at step 300. The predictive dialer system then attempts to establish telephone communications with the targeted individuals (make "connects") by dialing each targeted individual's telephone number at step 310. If the attempt is unsuccessful and a connect is not made at step 340, then an unsuccessful attempt resulting in no connect is recorded and the predictive dialer dials the next telephone number at 310. If the telephone connection 320 with remote telephone 40 results in a connect at step 340, then telephone connection 320' is transferred to an operator at step 350. The operator is viewing information associated with the targeted individual on a computer terminal and takes whatever action is appropriate at step 360. The appropriate action varies depending on whether a right party contact (with the targeted individual) or a wrong party contact (e.g., someone else or an answering machine) has been made. Whatever action is taken, the operator wraps up the call, entering the outcome of the contact into the computer and waits for the next telephone call. The predictive dialer system determines whether there are contact attempts remaining at step 370. If there are, the predictive dialer system dials the next telephone number.

At the end of the day, when all of the campaigns are completed, account database 80 stored in host computer system 10 and contact history 130 are updated with information describing the results of the attempts and contacts from the campaign at step 380. When faster processing is desired during the operation of an optimized campaign, new account or new number processing may also be done at the end of the day. At regular intervals, approximately once a month in the present embodiment, behavior models 160 are updated with the results of the campaigns that have been run. Behavior models 160 are updated using contact history data. In addition, performance reports 70 are generated for use in future performance forecasts and may also be displayed or printed if a report is requested.

Figure 4A:
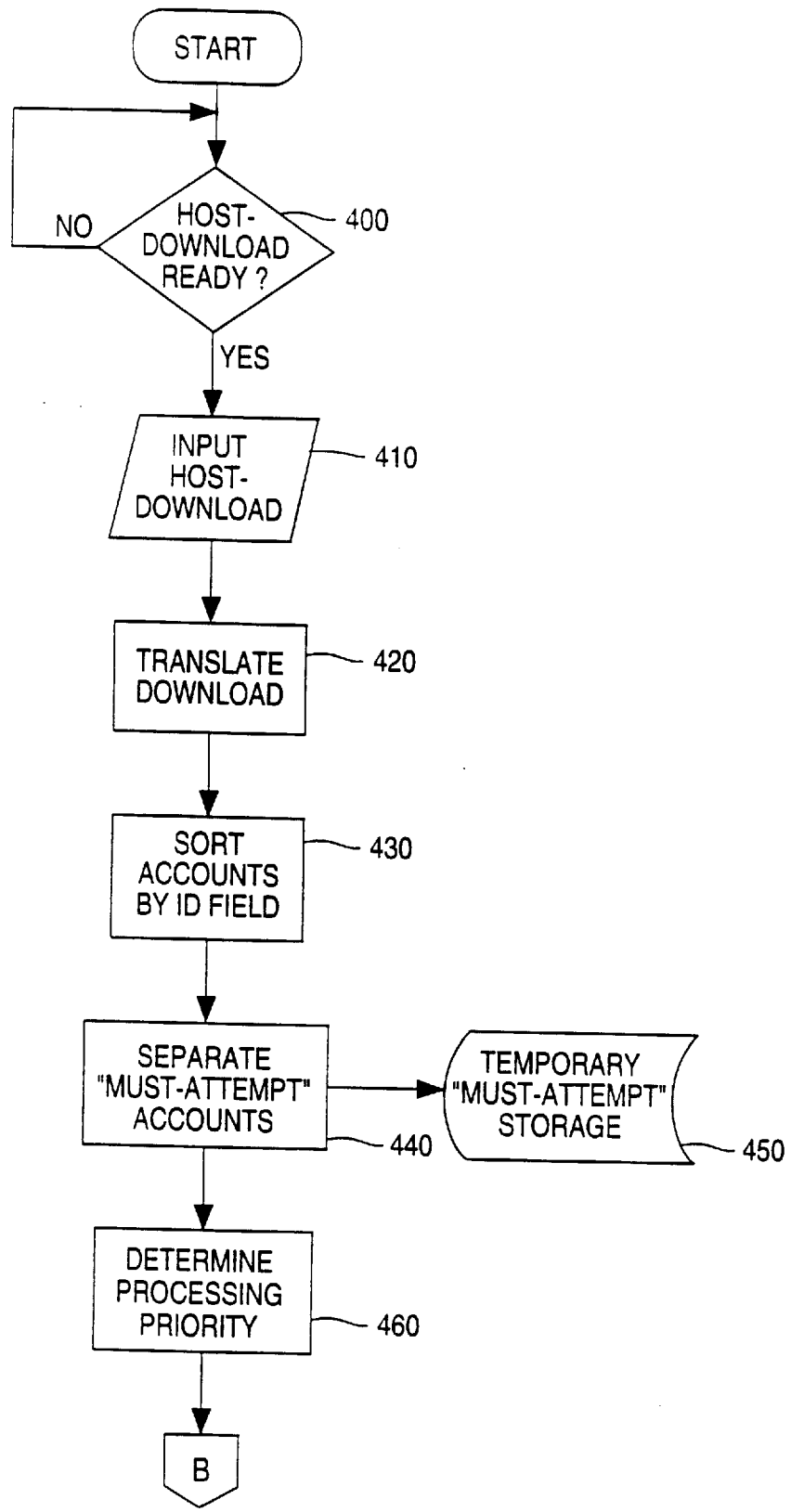
FIGS. 4a, 4b, and 4c are a flow chart diagram of the campaign optimization steps that occur in the campaign optimizer.
Figure 4B:
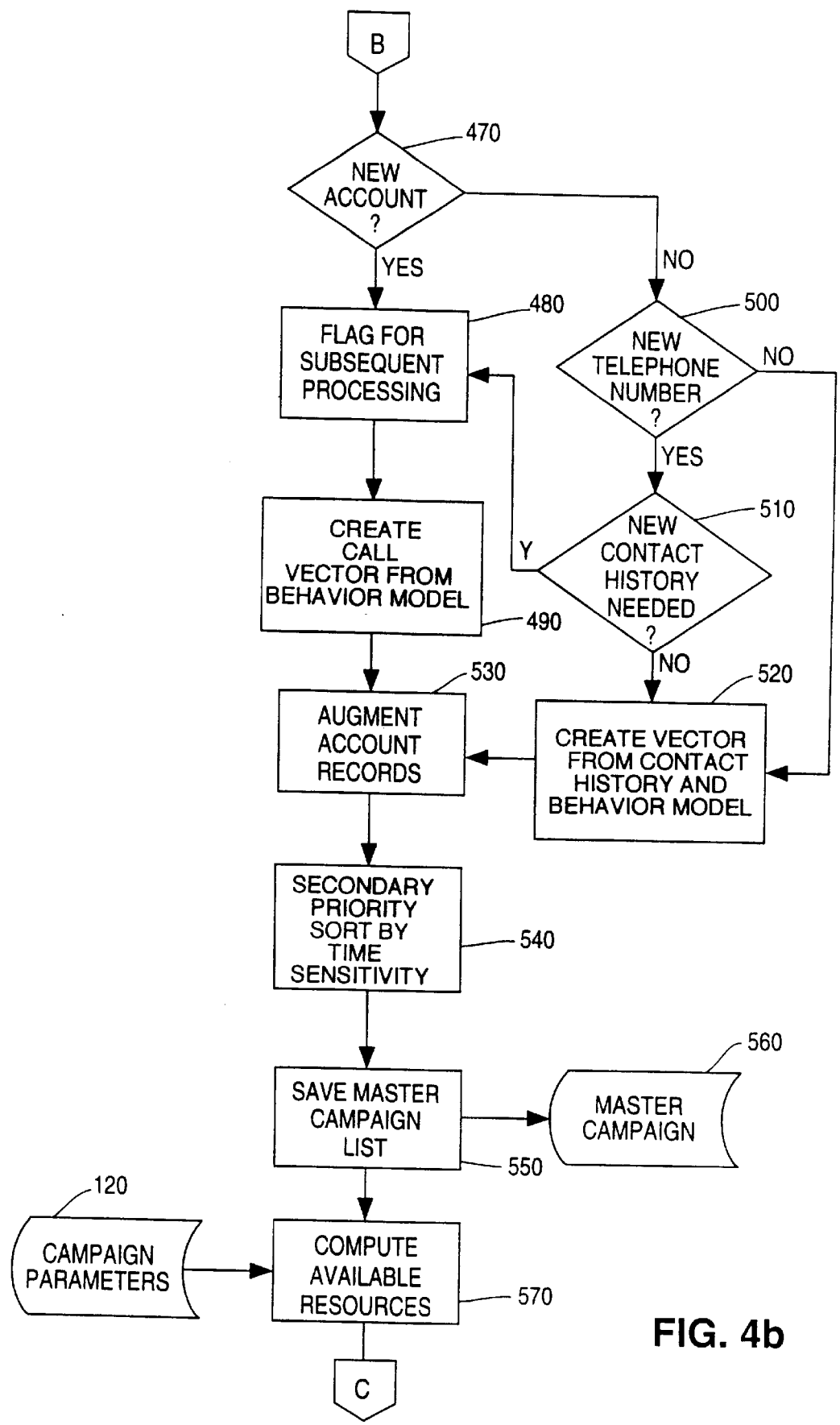
Figure 4C:
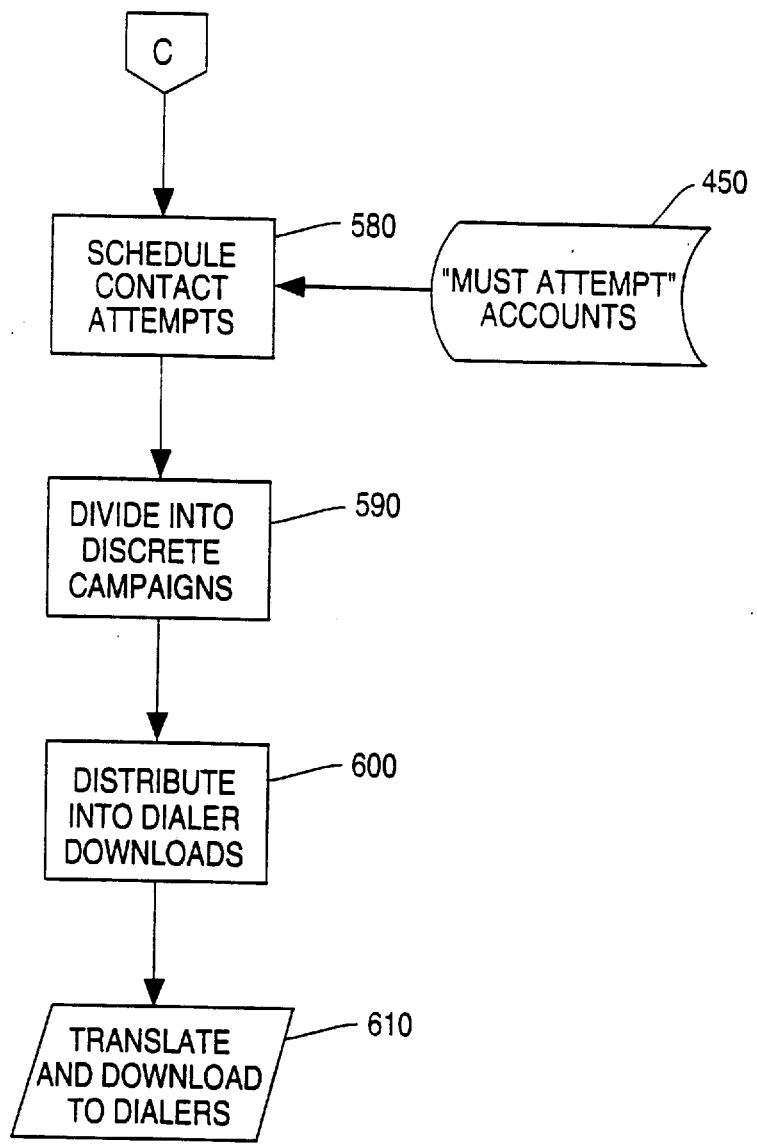

The discrete elements of campaign optimization that are performed by the campaign optimizer are shown in FIG. 4a, 4b and 4c. Before a campaign is optimized, the accounts which will comprise the campaign must be received by the campaign optimizer. Referring to FIG. 4a, the campaign optimizer polls host computer 10 at 400 while waiting for a subset of accounts for teleprocessing to be downloaded. Communication with the host computer system is accomplished using, for example, 3770 SNA to communicate with a mainframe computer system. When a subset of accounts for teleprocessing has been selected from database of accounts 80 and is ready for downloading, the host-download is input into the campaign optimizer at 410. If necessary, the host-download file is translated into a format useable in the campaign optimizer at 420.

Once the set of accounts for teleprocessing are in a format comprehensible to the campaign optimizer system, the process of campaign optimization begins. In the preferred embodiment the account records are maintained in random access memory of the campaign optimizer system and can be accessed without sorting. Alternatively, the records the records may be sorted, requiring a first step of sequential sorting of the accounts by a unique identifier field which is found in each account record at step 430. The social security number of the individual associated with each account may be utilized for the sorting.

Some of the account records for teleprocessing may be characterized as "must attempt" accounts. An attempt to contact the individual associated with the account must be made during the day, but it considered less important whether or not the individual is actually contacted. The processing priorities for these individual are considered irrelevant and handled separately, although each account, "must attempt" or otherwise, does have a contact history and a call vector. The campaign optimizer ensures that an attempt is made to contact the individuals associated with the "must attempt" accounts by alternative processing that ensures an attempt is made without displacing high priority accounts. The "must attempt" accounts may also be sorted, but they are temporarily stored in a separate file 450 at 440.

The processing priority values for the remaining account records are determined at 460. The priority scoring weights from the priority scoring table 120 are associated with the account record fields. The processing priority values are generally determined by multiplying the numeric account record fields by the corresponding priority scoring weights from the priority scoring table of campaign parameters 120. Thus the priority scoring table provides a method for assessing priority variably for each campaign, computing the relative priority importance of individual numeric fields in the account records by assigning a priority scoring weight of 0 (zero) to fields that are not used and high values (e.g., 999.999) to account record fields that are significant in determining priority.

The relative processing priority of each account record is dependent upon the account record's priority band. Each prioritized account record is placed into a priority band. These priority bands comprise user-defined inclusive ranges of processing priority values. Accounts are placed into these priority bands to facilitate the inclusion of other statistical parameters such as hour to hour distribution skewedness and all accounts in a priority band are considered to have the same priority value. The number of priority bands is based upon a system constant. In the preferred embodiment of the present invention, nine priority bands are used. Each prioritized account record is assigned to a priority band according to the following equation which produces a band number, B, in the range [0 . . . N-1].

$$B = \frac{\sum_{i}^{n} \frac{Value_i}{UpperBound_i} \times Weight_i}{\sum_{i}^{n} Weight_i} \times [N-1] \quad (1)$$

where N is the number of priority bands, n is the number of fields and each Value is capped by its respective UpperBound.

Referring now to FIG. 4b, the sorted and prioritized account records are augmented with call vectors for the individuals associated with the accounts. A call vector is an ordered sequence of call hours and destinations corresponding to the desired optimization goal (i.e., right contact probability, operator productivity, etc.). The number of vector dimensions corresponds to the number of legally permitted calling hours for the week. A single call vector is generated for an entire week. Call vectors are computed from the individual contact histories and behavior models by the process described in detail below. New accounts and accounts with new telephone numbers in different time zones have empty contact histories and call vectors are necessarily computed solely from behavior models.

Where processing speed during normal operating hours is a primary consideration, new account or new telephone processing may be deferred until the end of the day and done at night. New accounts or new telephone numbers may be determined by the absence of a preexisting database record corresponding to the account or telephone number, thereby eliminating the need to flag the account for subsequent processing. Irrespective of whether new account and/or new number processing is done at night or during the campaign, the same processing steps are performed.

Alternatively, as shown in FIG. 4b, a determination may be made as to whether each account for teleprocessing is a new account at 470. If the account is a new account, then the account is flagged for subsequent processing after creating the optimized campaign list at 480. This subsequent processing involves the initialization of a contact history for the account. A call vector for the new account is then created from the behavior model with the largest associated population at 490. If necessary, the call vector is adjusted for the time zone corresponding to the specific account.

If an existing account has a new telephone number at 500, the new telephone number is analyzed to determine whether the contact history corresponding to the old telephone number should be flagged for discard and the new telephone number flagged for creation of a new contact history, similar to new accounts, at 510. The new telephone number is analyzed to determine whether the new telephone number is in a different time zone than the original telephone number. If the new number has the same area code or a new area code within the same time zone, the original contact history may still be reliably used. In those situations where the new telephone number places the account into a different time zone, the existing contact history for the account is purged, the account is flagged for subsequent processing at 480 and behavior models for the new time zone are used to construct a new call vector as if the number were a new account at 490. If the new telephone number has the same area code or a new area code in the same time zone, the existing contact history is presumed accurate and is not purged.

Call vectors are generated for accounts with valid contact history data (i.e., unchanged accounts and changed accounts where the telephone number change does not alter the expected behavior of the targeted individual), from the contact history for the individual associated with the account and corresponding behavior models at 520. Each of the account records is then augmented by a corresponding call vector at 530. The set of accounts with associated call vectors are referred to as augmented accounts.

The augmented accounts are then sorted by processing priority at 540. Accounts that have been designated as "must attempt" accounts are not necessarily scheduled for contact attempts at times of highest probability or operator productivity and are sorted behind all prioritized accounts. Therefore, "must-attempt" accounts are not prioritized in the same manner. The prioritized accounts (the accounts that are not "must-attempt" accounts) are then reorganized according to the relative contact priority of each account. The prioritized accounts, which have already been placed into priority bands according to the previously determined processing priority value (based on weighted parameters), are then further prioritized according to secondary considerations. These secondary considerations may be, for example, the location of the times of high contact probability ("time sensitivity").

Time sensitivity accounts for the number of other individuals with simultaneous times of high contact probability or operator productivity. For example, most individuals have a high contact probability associated with the time interval between eight and nine o'clock in the morning. However, relatively few individuals have a high contact probability associated with the time interval between eleven and twelve o'clock. Time sensitivity also compensates for variations in bimodal behavior, such as those individuals with several time intervals of high contact probability distributed throughout the day.

Secondary considerations are taken into account in the campaign optimizer to prevent teleprocessing capacity restraints from forcing relatively high priority account contact attempts to be unnecessarily made at times of low contact probability or operator productivity. This could occur if all of the accounts in a single priority band were processed in a random sequence without scheduling less time sensitive accounts after the accounts with relatively few times of high contact probability or operator productivity.

Time sensitivity, which considers how many other individuals share the same times of high contact probability accounts for both bimodal and multimodal contact probability distributions. Time sensitivity is computed by considering peakedness in relation to teleprocessing capacity. For purposes of computing time sensitivity, peaks are computed by determining times of contact probability, $P_{peak}$, where the contact probability, $P_i$, exceeds a parameterized probability as shown in the following equation.

$$P_{peak} = P_i \geq \mu \times P_{medium} \quad (2)$$

where $P_i$ is the probability of right party contact at the $i^{th}$ hour, $\mu$ is a scheduling parameter, set to 2 in the present embodiment, and $P_{median}$ is the median contact probability for the relevant time interval (i.e. morning, midday or evening). The value of $\mu$ corresponds to an assumption regarding the distinction between high and normal contact probabilities, presumed to be a doubling in probability in the present embodiment.

For each individual, the number of hours with a contact probability of $P_{peak}$, H, is then determined. It is then determined whether, for the preceding day, there were more accounts optimally placed at each hour of $P_{peak}$ probability then there was available teleprocessing capacity. The total number of hours in which teleprocessing capacity was exceeded by campaign demands during the relevant time periods is represented by the variable 'O'.

The time sensitivity of each individual is then computed as shown in the following equation.

$$\text{Sensitivity} = \frac{1}{\left(H - \frac{O}{P}\right)} \quad (3)$$

where H is the number of hours with $P_{peak}$ contact probability, O is the number of hours with $P_{peak}$ contact probability during which, in the corresponding hour of the preceding business day, teleprocessing capacity was exceeded by individuals with highest contact probability at that hour, and P is a scheduling parameter that is set to 2 in the present embodiment. The value of P is set in accordance with the same rationale by which the value for $\mu$ is set above. For those individuals with no hours with $P_{peak}$ contact probability (i.e., H=0), Sensitivity=0. This computed value of time sensitivity is then used to determine the priority of individual accounts within the priority bands, either in conjunction with or instead of skewedness.

Once the accounts have been prioritized, first into priority bands according to processing priority and secondly according to time sensitivity in the present embodiment within the priority bands, a master campaign list 560 is saved at 550. The master campaign list includes the "must attempt" accounts, although they are not prioritized. Once the prioritized master campaign list has been processed, the resources available to conduct the campaign are computed at 570 based on both campaign parameters 120 and performance forecasts.

The campaign parameters input by the campaign administrator at campaign parameters 120 provide information regarding physical resources available to conduct the campaign, such as the number of available operators. Performance forecasts based on standard predictive dialer reporting statistics such as average connect time, good and bad contact connect times, wrap up times and the relative efficiency of operator utilization are incorporated into the processing. Alternatively, performance forecasts may be determined by historical analysis of data collected over a number of campaigns. Advantageously, campaign capacity may then be individually forecast for each hour of the campaign in terms of the number of contact attempts per operator. The maximum size of each campaign (i.e, the number of accounts which may be effectively handled during the selected time interval) is then forecast, establishing the contact attempt restraints for each optimized telephone contact campaign. The number of accounts that can be handled in an hour of a campaign, (the campaign capacity A), may be determined according to the following equation:

$$A = S \times f \times \frac{U \times 60}{R_{ca} \times [R_{gc} \times T_g + (1 - R_{gc}) \times T_{ng}]} \quad (4)$$

where S=number of operators (staffing level), U=number of minutes per hour an operator is talking on the telephone (utilization), f=safety factor (0.90 or 90%), $R_{ge}$=ratio of good (right party) contacts to all contacts, $R_{ca}$=ratio of contacts to attempts, $T_g$=average time for good (right party) contacts in seconds, and $T_{ng}$=average time for no-good (wrong party) contacts in seconds.

Alternatively, the number of accounts that can be handled by an operator in the $i^{th}$ hour (i=1 ... 24) of the $j^{th}$ day (j=1 ... 7), $A_{ji}$, may also be forecast by historical analysis as expressed in the following equation.

$$A_{ji} = B_j \times S_{ji} \quad (5)$$

where $B_j$, a baseline value for the number of accounts that can be dialed that represents long term trends and $S_{ji}$, a seasonality for the $i^{th}$ hour and $j^{th}$ day, are values produced from historical data using classical multiplicative decomposition. The historical data used to determine values of $B_j$ and $S_{ji}$ represents the previous two weeks of operation to insures rapid adjustment of the forecast. In order to ensure accurate forecasting, the historical data should be filtered, substituting average data for obviously erroneous input data. In addition, the values of $S_{ji}$ should be validated by verifying that newly calculated values of $S_{ji}$ are within two standard deviations of the historical average.

Referring now to FIG. 4c, the augmented and prioritized accounts (not including the "must attempt" accounts) are scheduled for contact attempts in descending order of priority at 580. An account is scheduled for an attempt to be made during the time interval of maximum right contact probability if there are resources available to make an attempt during that time interval. If there are no available resources, (i.e. all the operators on all the dialers are predicted to be fully occupied), then the attempt is scheduled to be made during the time interval of highest right contact probability when resources are available. Once all the prioritized accounts have been scheduled for attempts, the accounts with "must attempt" priority 450 are then scheduled for attempts to be made at whatever times there are resources available for an attempt. If there are not enough available resources remaining to attempt to contact each "must attempt" priority account then the lowest priority accounts will be "bumped" to guarantee that an attempt to contact all the "must attempt" accounts is made.

Once all the accounts in the master campaign list have been scheduled for contact attempts, the accounts are divided into separate campaigns at 590. Each campaign includes the contact attempts to be made during the campaign time interval, usually one hour. For each campaign, the contact attempts are distributed into separate dialer-downloads for each predictive dialer at 600. The size of each separate dialer-download is calculated so that an attempt will be made to contact every account in the dialer download during the campaign time interval. These dialer capacity calculations are based on performance predictions coupled with the available resources. The dialer-downloads are then translated, if necessary, and downloaded to the predictive dialer system for teleprocessing at 610.

After the telephone contact campaigns are completed, performance statistics are compiled from the predictive dialer and operator reporting. Accounts which were flagged for processing, either new accounts or old accounts with new data, are appropriately processed. This processing includes the construction of a contact history for the account record and changing the stored data in the relevant account record fields as needed.

The computation of a call vector associated with a telephone number involves an analysis of the previous attempts to contact the targeted individual and behavior models representative of expected behavior. Call vectors are constructed from a combination of contact history data for an account and the behavior model that most closely matches the existing data for that account.

Information on every telephone attempt made during the day (or morning, if midday recalculation is being performed) is extracted from the predictive dialer system and used to update the contact history database at regular intervals, normally nightly. For each account record updated, the number of observations (attempts) is examined. For each hour of each day of the week, a determination is made as to whether the contact history contains enough data to determine the probability of a right party contact with sufficient confidence. The number of observations is a measure of confidence that the measured probability (number of successful attempts . number of attempts) closely approximates the actual probability. If the number of observations is less than a target confidence value, values for attempts and good contacts are aggregated across the same hour for the remaining weekdays. The use of aggregated statistics is appropriate because weekday-to-weekday fluctuation in contact probabilities for a given hour are smaller than the error introduced by using too few observations. There is no aggregation across Saturday or Sunday because Saturday and Sunday, being in the weekend, tend to have inherently different hour-to-hour contact probabilities than weekdays when most individuals are working.

An example of the aggregation procedure follows, given an assumption that for a specific individual the data shown in Table 1 exists for the hour between 8:00 and 9:00 a.m. and a confidence parameter of four is used.

TABLE 1

Individual contact history

|  | Mon. | Tues. | Wed. | Thurs. | Fri. | Sat. | Sun. |
| --- | --- | --- | --- | --- | --- | --- | --- |
| Attempts | 1 | 0 | 0 | 4 | 1 | 0 | 0 |
| Contacts | 1 | 0 | 0 | 1 | 0 | 0 | 0 |

It can be seen that the results for Monday, Tuesday, Wednesday and Friday do not meet the confidence requirements because the number of observations is less than the confidence parameter of four. Therefore an aggregation is made across Monday through Friday. This aggregation results in six attempts with two successful contacts, producing an aggregated probability of right party contact of ⅓ or 0.33. This result is placed in the aggregated probability field for each day, except Thursday which meets the confidence level as shown in table 2 below.

TABLE 2

Aggregated individual contact history

|  | Mon. | Tues. | Wed. | Thurs. | Fri. | Sat. | Sun. |
| --- | --- | --- | --- | --- | --- | --- | --- |
| Attempts | 1 | 0 | 0 | 4 | 1 | 0 | 0 |
| Contacts | 1 | 0 | 0 | 1 | 0 | 0 | 0 |
| Aggregated Probability | 0.33 | 0.33 | 0.33 | 0.25 | 0.33 | 0 | 0 |

Processing is performed in the above manner until all hours for all days of the week have been processed. A behavior model is then selected for the account and used to supplement the observed attempts of the contact history.

The behavior models represent categories of behavior for the individuals targeted to be contacted with the behavior being the likelihood that a phone call attempt will generate a right party contact. The behavior models are lists that, for each one hour period, specify the probability of an attempt resulting in a right party contact. Behavior models fill in missing data by providing data for hours for which no actual data exists for an individual and for smoothing actual result data. Selection of a viable behavior model for an individual requires consideration of how to match a profile with an individual. Behavior models are established using the cluster analysis program.

For example, a portion of a behavior model for a weekday may be thought of as shown in the following table.

TABLE 3

Sample partial behavior model.

| Time | Probability |
|---|---|
| 8–9 P.M. | .75 |
| 9–10 A.M. | .25 |
| 10–11 A.M. | — |
| — | — |

Figure 7:
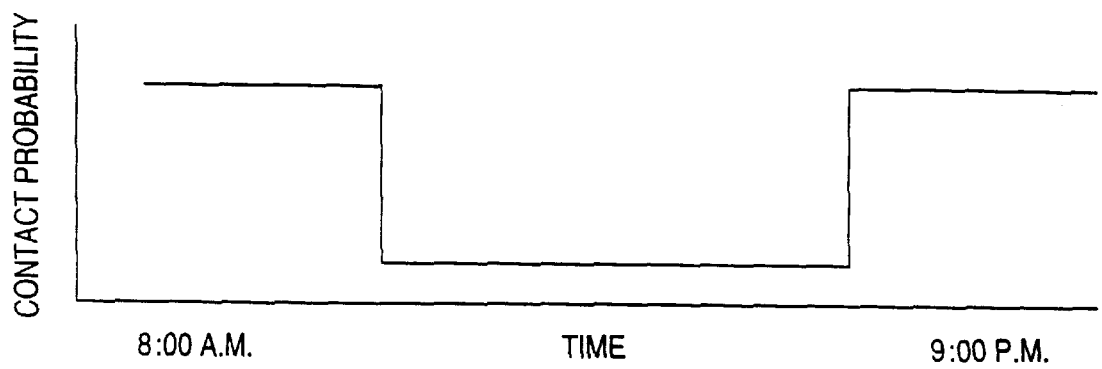
FIG. 7 is a graph showing the bimodal behavioral model of contact probability.

Creating viable behavior models begins with constructing a model of behavior which both assists in constructing the starting profiles and helps extract the maximum value from each attempt. The model of behavior in the present embodiment assumes that the basic contact probability curve for an individual is bimodal as shown in FIG. 7.

The basic shape of the contact curve is the same for either home or work telephone numbers. The shape of the contact curve for a home telephone number results from the assumption that most people are at home for some period in the morning, leave for an extended period of time and then return home, where they remain for an extended period. Different starting profiles reflect variations in the time for the beginning and end of the midday low-probability period.

For work telephone numbers, there tend to be periods in the early part of the day when contact probability is relatively high. Most individuals are getting ready for the business day and tend to answer their own phones, whereas the middle part of the day tends to be filled with meetings, lunch, etc., which significantly reduce the likelihood of a right party contact. However, the end of the day is characterized by wrap-up time when secretaries and receptionists have gone home and a right party contact is much more likely. The contact profiles for work telephone numbers, like those for home telephone numbers, are differentiated by the hours at which the high probability periods of high right contact probability begin and end.

Behavior models are not just divided between home and work telephone numbers. The behavior models are also divided into three periods of the day: morning, from 8:00 a.m. to 12:00 p.m.; afternoon, from 12:01 to 5:00 p.m.; and evening, from 5:01 to 9:00 p.m. This trifurcation reflects the implicit assumption that an attempt result in any one period is relatively uninformative as to expected behavior in the other periods. On the other hand, measurements within a period, given the behavioral model used, provide reasonably accurate predictions as to other hours within the same period.

The proposed starting profiles used in the present embodiment are shown in the following three tables. As can be seen, each profile follows the behavioral model of bimodality with respect to periods of high contact probability during a given day. In these tables, "high" and "low" correspond to probabilities of right party contact of approximately 0.60 (60%) and 0.1 (10%) respectively.

TABLE 4

Morning behavior models.
MORNING STARTING PROFILES

| Profile Name | 8–9 a.m. | 9–10 a.m. | 10–11 a.m. | 11–12 p.m. |
|---|---|---|---|---|
| 809 high | high | low | low | low |
| 810 high | high | high | low | low |
| 811 high | high | high | high | low |
| 812 high | high | high | high | high |
| 812 low | low | low | low | low |

TABLE 5

Midday behavior models.
MIDDAY STARTING PROFILES

| Profile Name | 12–1 p.m. | 1–2 p.m. | 2–3 p.m. | 3–4 p.m. | 4–5 p.m. |
|---|---|---|---|---|---|
| 1205 low | low | low | low | low | low |
| 1204 low | low | low | low | low | high |
| 1203 low | low | low | low | high | high |
| 1201 high | high | low | low | low | low |
| 1205 high | high | high | high | high | high |

TABLE 6

Evening behavior models.
EVENING STARTING PROFILES

| Profile Name | 5–6 p.m. | 6–7 p.m. | 7–8 p.m. | 8–9 p.m. |
|---|---|---|---|---|
| 509 high | high | high | high | high |
| 609 high | low | high | high | high |
| 709 high | low | low | high | high |
| 809 high | low | low | low | high |
| 509 low | low | low | low | low |

Determination of the correct profile for an individual requires separate examination of morning, midday and evening contact data. For each separate period, the behavior model with the minimum of the sum of the squares of the differences between the behavior model and the call vector components corresponding to the profile time period is selected as shown below.

$$Sum_j = \sum_{i=1}^{n} (M_i - P_{ji})^2 \qquad (6)$$

where $M_i$ is the aggregated contact probability for the $i^{th}$ hour for a targeted individual, $P_{ji}$ is the right party contact probability for the $i^{th}$ hour of the $j^{th}$ profile and n is the number of hours.

There will be instances where the value of $M_i$ is "NA." That is, hours for which no data is available. When this occurs, the term is ignored in the above sum. All the values of sum are examined and the profile j with the smallest value of Sum is chosen. For those cases in which multiple profiles give the same value of Sum, the profile which had the largest population associated with it in the cluster analysis process is chosen.

The choice of starting profiles has the effect of enforcing the behavioral model. For example, a morning positive contact in a single attempt at 9:03 A.M. would result in profiles 810 high, 811 high, and 812 high being found, each with an equal value of Sum. The profile to which the highest number of accounts have been assigned would be selected. For each of these profiles, a positive contact at 9:03 a.m. implies a high contact probability during the preceding hour between 8:00 and 9:00 a.m.

Figure 6:
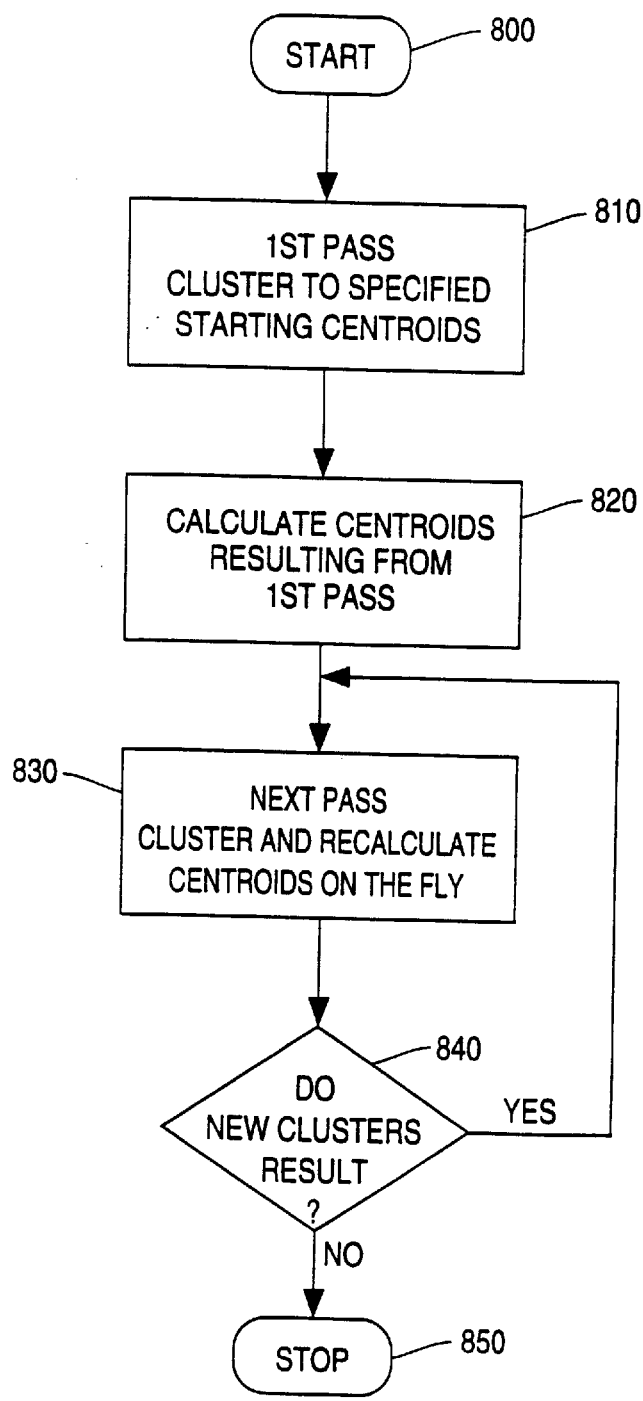
FIG. 6 is a flowchart showing the process of modified non-hierarchical cluster analysis used to create and select behavior models.

Behavior models are created from all call vectors on the implicit assumption that past behavior, on average, is representative of the average behavior of newer accounts in the same environment. Behavior models are created by reiterative processing of the available data set until the best set of categories for the data is produced through modified non-hierarchical cluster analysis. This technique is illustrated schematically in FIG. 6.

Both the number and details of the starting vectors for the cluster analysis, known as centroids, are based upon the initial behavioral model. Each row of Tables 4, 5 and 6 above represents a possible starting vector in the present embodiment. For each call vector, it is necessary to determine to which cluster the vector should be assigned for processing. Each call vector is assigned to the cluster with which there is the minimum n-space distance between the vector and the centroid of the cluster. Once vectors have been assigned to clusters the centroids are recalculated and the components of each vector are averaged, ignoring the NA components. This process is repeated until new clusters are no longer produced by the centroid recalculation. The number of contact histories in a given cluster is thus the population associated with that cluster's centroid. A pseudocode implementation of the non-hierarchical cluster analysis by which behavior models are created is shown in the following tables wherein the variables are defined as follows.

CENTROID (K,M) is a K×M array of real values representing the centroids of the clusters.

K is an integer representing the number of clusters.

M is an integer representing the number of time periods used, for example there are four time periods used for cluster analysis of the morning period.

PROBABILITY (N,M) is a N X M array of real values representing the call vectors of the individuals to be clustered.

N is an integer representing the number of individuals to be clustered. N may be the entire database of records from the host computer for which contact histories have been maintained or it may be a statistically valid subset, perhaps one to five thousand records.

ASSIGNMENT (N) is a one dimensional array of integer values representing which cluster each of N individuals is associated with (assigned to).

I, J, and P are integer variables that provide loop indices of the "for" loops used to process the arrays.

BESTDIST is a real value representing the best sum of the squares distance found at that point.

BESTP is an integer value representing an index corresponding to the cluster with the smallest n-space distance (calculated by sum of the squares) from an individual.

SUMOFSQS is a real value representing the sum of the squares distance between a cluster and an individual.

KOUNT (K,M) is a K X M array of integers representing the number of individuals clustered around a centroid.

FLAG is an integer value that is set if any new clusters have been generated by the last iteration of clustering and centroid recalculation.

KK is an integer value that is used in the reassignment of individuals to new clusters and cluster processing when new clusters are produced.

The following table shows the start and input procedure 800.

TABLE 7

Input

INPUT

Input M
Input N
Input PROBABILITY (N,M)
Input K
Input CENTROID (K,M)

The next table shows a pseudocode implementation of the first stage in which the individual call vectors, which may have N/A entries, are clustered around specified starting centroids as shown at 810. As stated, the starting centroids specified will reinforce the behavioral model of individuals to be contacted using the campaign optimizer.

TABLE 8

First Pass

FIRST PASS - CLUSTER TO SPECIFIED STARTING CENTROIDS

FOR LOOP: FOR 1 FROM 1 TO N
  INITIALIZE: BESTDIST = 999999
  FOR LOOP: FOR P FROM 1 TO K
    INITIALIZE: SUMOFSQS = 0
    FOR LOOP: FROM J FROM 1 TO M
      IF PROBABILITY (I,J) = 'N/A' THEN NEXT J
      SUMOFSQS + = (CENTROID (P,J) − PROBABILITY (I,J))$^2$
    NEXT J
    IF SUMOFSQS < BESTDIST THEN BESTDIST = SUMOFSQS and
      BESTP = P
  NEXT P
  ASSIGNMENT(I) = BESTP
NEXT I Following execution of the pseudocode in the preceding table, the individual call vectors have all been clustered around specified starting centroids. Next, centroids resulting from the first pass are calculated at 820 as shown in the following table.

TABLE 9

Calculate centroids

Calculate Centroids Resulting From First Pass

FOR LOOP: FOR 1 FROM 1 TO N
  FOR LOOP: FOR J FROM 1 TO M
    IF PROBABILITY (I,J) = 'N/A' THEN NEXT J
    CENTROID(ASSIGNMENT(I),J) += PROBABILITY(I,J)
    KOUNT(ASSIGNMENT(I),J) = KOUNT(ASSIGNMENT(I),J)+1
  NEXT J
NEXT I

FOR LOOP: FOR P FROM 1 TO K
  FOR LOOP: FOR J FROM 1 TO M
    IF KOUNT(P,J) = 0 THEN NEXT J
    CENTROID(P,J) = CENTROID(P,J) / KOUNT(P,J)
  NEXT J
NEXT P

The centroids calculated in accordance with the preceding pseudocode are then used to perform another cluster analysis. This process of repeated centroid calculation and cluster analysis 830 is repeated until no additional clusters result 840 from the centroid recalculations. It is also possible terminate the iterative cluster analysis and centroid recalculation after a specified number of iterations where processing conditions require faster processing. The iterative process of cluster analysis and centroid recalculation is demonstrated in the following pseudocode.

TABLE 10

Cluster and Recalculate Centroids on the Fly

Cluster Analysis and Centroid Recalculation

```
BEGIN
Initialize FLAG = 0
FOR LOOP: FOR I FROM 1 TO N
  Initialize BESTDIST = 999999
  FOR LOOP: FOR P FROM 1 TO K
    Initialize SUMOFSQS = 0
    FOR LOOP: FOR J FROM 1 TO M
      IF PROBABILITY(I,J) = 'N/A' THEN NEXT J
      SUMOFSQS += (CENTROID(P,J) - PROBABILITY(I,J))²
    NEXT J
    IF SUMOFSQS < BESTDIST THEN
      BESTDIST = SUMOFSQS and BESTP = P
  NEXT P
  IF ASSIGNMENT(I) = BESTP THEN NEXT I
  FLAG = 1
  FOR LOOP: FOR J FROM 1 TO M
    IF PROBABILITY(I,J) = 'N/A' THEN NEXT J
    KK = ASSIGNMENT(I)
    CENTROID(KK,J) += KOUNT(KK,J) *
        CENTROID(KK,J) - PROBABILITY(I,J)
    KOUNT(KK,J) = KOUNT(KK,J) - 1
    IF KOUNT(KK,J) = 0 THEN NEXT J
    CENTROID(KK,J) += CENTROID(KK,J) / KOUNT(KK,J)
    ASSIGNMENT(I) = BESTP
    KK = BESTP
    CENTROID(KK,J) = KOUNT(KK,J) *
        CENTROID(KK,J) = KOUNT(I,J)
    KOUNT(KK,J) = KOUNT(KK,J) + 1
    CENTROID(KK,J) = CENTROID(KK,J) / KOUNT(KK,J)
  NEXT J
NEXT I
IF FLAG > 0 THEN BEGIN
```

If no new clusters are produced (or the maximum number of iterations allowable in the available processing time have been processed) then the matrices PROBABILITY (I, J) and ASSIGNMENT (I) for all values of I and J and the matrices CENTROID (P, J) for all values of P and J are stored in the campaign optimizer and behavior model generation is stopped at 850.

New behavior models are only created (or existing behavior models modified) after a sufficient number of contact histories have been updated through normal campaign operations to provide a statistically significant variation in the data set (i.e., either the same contact histories with less data or significantly less contact histories) used to previously generate the behavior models. In the present embodiment, behavior models are generated at monthly intervals.

Once a behavior model is selected, the selected behavior model is combined with the aggregated contact data, taking into consideration that individual data always takes precedence over demographic data. Because the number of individual observations is generally very small, a weighted blending produces better results than merely considering individual observations when available. A weighted blending of the probabilities in the call vector with those in the selected behavior model is made using a modified exponential smoothing in accordance with the following equation:

$$V_i = \left(1 - \frac{\alpha}{n}\right) \times P_i + \frac{\alpha}{n} \times D_i \quad (7)$$

where $V_i$ is the $i^{th}$ aggregated call vector component used in all best-time-to-call calculations; $P_i$=the $i^{th}$ call vector component {real customer data}, $D_i$ is the $i^{th}$ call vector component for the behavior model; n is the number of measurements (data points for this hour); and $\propto$ is a smoothing parameter, generally ≈0.375.

In those situations where there is no individual contact history data, i.e., $P_i$="NA" (n=0), then $V_i$ is set equal to $D_i$. In other words, the call vector component for the individual is set to the corresponding value in the behavior model without any exponential smoothing.

The value of the smoothing parameter, $\propto$, is decided on the basis of the two criteria. First, a single successful contact, when combined with any demographic result will yield a smoothed resultant probability higher than any unsmoothed demographic result, thereby ensuring that this hour will appear at the top of the best time to call list. Second, a number of unsuccessful attempts (approximately 3–5) in a given hour will generate a smoothed probability lower than any unsmoothed demographic result, thereby ensuring that this hour will not be retried until all other hours have been tried.

The first condition can be expressed as shown in the following equation:

$$D_{i_{(max)}} < (1-\alpha) + \alpha \times D_{i_{(max)}} \quad (8)$$

where $D_{i_{(max)}}$ is the largest of $D_i$, and $D_{i_{(min)}}$ is the smallest. The second condition can be expressed as shown in the following equation:

$$\frac{\alpha \times D_{i_{(max)}}}{(K+1)} < D_{i_{(min)}} < \frac{\alpha \times D_{i_{(max)}}}{K} \quad (9)$$

where K is the number of attempts without right party contact.

For example, the value for $D_{i_{(max)}}$ is approximately 0.6 and the value for $D_{i_{(min)}}$ is approximately 0.1 in the present embodiment. Therefore, the value for $\propto$ is determined by solving equations 8 and 9 for $\propto$ as shown below.

Solving the first condition for $\propto$:

$$0.6 < (1-\alpha) + (0.1)\alpha; \ 0.4444 > \alpha \quad (10)$$

Solving the second condition for $\propto$:

$$0.6\alpha/(K+1) < 0.1 < 0.6\alpha/K;$$

$$\alpha < 0.1667 \times (K+1)p \quad (11)$$

$$\alpha > 0.1667 \times K;$$

For K=2: 0.333<α<0.5001

A value of $\propto=0.375$ has been determined to produce satisfactory results with these and other likely values of $D_{i_{(max)}}$ and $D_{i_{(min)}}$.

The behavior model selected for the call vector is the behavior model with the minimum sum of the squares of the differences between the behavior model and the call vector components determined from the contact history. The values from the selected behavior model are used to fill out the undetermined values for the complete call vector. These complete call vectors are then used to augment the associated accounts in the master campaign file.

Campaign optimization is not solely dependent on maximizing the number of right party contacts per contact attempt. There are situations where maximizing the ratio of right party contacts may actually result in a less than optimal number of right party contacts during a particular unit of time in a campaign. This can occur, for example, when right party contacts are made during the work day and it is necessary to speak to one or more receptionists and/or secretaries before making contact. Under these circumstances, the additional time required for each right party contact eliminates the benefit obtained by lowering the number of wrong party contacts and the campaign is therefore not optimized. In these situations, a campaign, or a portion of a campaign, is optimized by maximizing operator productivity instead of the ratio of right party contacts. A campaign which is optimized over a period of several hours may require a combination of both strategies.

Operator productivity is expressed by the number of right party (or "good") contacts per unit time and is determined in accordance with the following equation:

$$\frac{n_g}{T} = U \times \frac{R}{(R \times t_g + (1-R) \times t_{ng})} \quad (12)$$

where $n_g$ is the number of right party (good) contacts, T is a time unit of specified duration, U is dialer utilization, R is the probability of a right party contact, $t_g$ is the talk time for a right party (good) contact and $t_{ng}$ is the talk time for a wrong party (not good) contact. The values of $t_g$ and $t_{ng}$ are the average values for talk time and separate values of $t_g$ and $t_{ng}$ are used for work and home contact numbers.

The value of U, dialer utilization, may be regarded as a constant and therefore ignored when evaluating alternative campaign strategies. For each hour of the campaign, the operator productivity is operationally evaluated for both home and work telephone numbers: where $$O_n = \frac{R}{R \times T_g \times (1-R)T_{ng}} \quad (13)$$

$O_n$ is operator productivity for the $n_{th}$ hour, R is the probability of a right party contact, $t_g$ is the average talk time for a right party (good) contact and $t_{ng}$ is the average talk time for a wrong party (not good) contact. The values for operator productivity are then ranked in descending order, creating a list ranking potential calling hours and destinations in order of the expected rate of right party contacts.

Alternatively, it may be desired to simply maximize the number of contact attempts, such as when processing many "must attempt" accounts. In this circumstance, for each time unit of the campaign, throughput would be calculated in accordance with the following equation:

$$\frac{n_g}{T} + \frac{n_{ng}}{T} = \frac{U \times R}{R \times t_g + (1-R) \times t_{ng}} + \frac{U \times (1-R)}{R \times t_g + (1-R) \times t_{ng}} \quad (14)$$

$$= U \times \frac{1}{R \times t_g + (1-R) \times t_{ng}}$$

where $n_g$ is the number of right party (good) contacts, $n_{ng}$ is the number of wrong party (not good) contacts, T is a time unit of specified duration, U is dialer utilization, R is the probability of a right party contact, $t_g$ is the talk time for a right party (good) contact and $t_{ng}$ is the talk time for a wrong party (not good) contact. The values of $t_g$ and $t_{ng}$ are the average values for talk time and separate values of $t_g$ and $t_{ng}$ are used for work and home contact numbers. In the same manner as operator productivity, time units of maximum throughput are ranked in descending order for both work and home numbers.

An optimal campaign may also include attempting contact at more than one number for each account processed. For example, a home then work strategy may be tried where the home number is attempted first and, if wrong party or no good contact is made at home, then a contact attempt is made at the work number. Alternatively, work then home number, home number only or work number only strategies may be considered. Each strategy can be evaluated for campaign optimization in terms of right party contact ratio, operator productivity, maximum throughput or an alternative criteria. By empirically evaluating multiple strategies, optimal strategies and optimal calling times can be combined for campaign optimization.

For a home then work strategy, as an example, the total number of right party (good) contacts, $n_g$ is the sum of right party contacts at home and right party contacts at works as shown in the following equation.

$$n_g = [P_h \times n] + [(1-P_h) \times P_w \times n \times m] \quad (15)$$

where n is the number of accounts called, $P_h$ is the probability of right party contact at home, $P_w$ is the probability of right party contact at work if no good contact at home, and m is the fraction of calls retried at work.

The total time spent calling the accounts is the sum of the time spent on right party (good) contacts at home, wrong party (not good) contacts at home, right party (good) contacts at home, and wrong party (not good) contacts at work as shown in the following equation.

$$n \times \{[P_h \times T_{hg}] + [(1-P_h) \times T_{hng}] + [m(1-P_h) \times P_w \times T_{wg}] + [m(1-P_h) \times (1-P_w) \times T_{wng}]\} \quad (16)$$

where n is the number of accounts called, $P_h$ is the probability of right party contact at home, $P_w$ is the probability of right party contact at work if no good contact at home, $T_{hg}$ is the talk time for right party (good) contact at home, $T_{hng}$ is the talk time for wrong party (not good) contact at home, $T_{wg}$ is the talk time for right party (good) contact at work, $T_{wng}$ is the talk time for wrong party (not good) contact at work, and m is the fraction of calls retried at work.

The number of right party contacts per unit time, i.e., operator productivity, may then be calculated as follows.

$$\frac{P_h + m(1-P_h) \times P_w}{P_h \times T_{hg} + (1-P_h) \times T_{hng} + m(1-P_h) \times P_w \times T_{wg} + m(1-P_h) \times (1-P_w) \times T_{wng}} \quad (17)$$

where $P_h$ is the probability of right party contact at home, $P_w$ is the probability of right party contact at work if no good contact at home, $T_{hg}$ is the talk time for right party (good) contact at home, $T_{hng}$ is the talk time for wrong party (not good) contact at home, $T_{wg}$ is the talk time for right party (good) contact at work, $T_{wng}$ is the talk time for wrong party (not good) contact at work, and m is the fraction of calls retried at work. Similar calculations may be used to analyze a work then home strategy.

For each hour of the campaign, each strategy is evaluated to determine which strategy produces optimal results for that hour. For example, a work then home strategy may produce maximum operator productivity at the end of the work day whereas a home then work strategy maximizes operator productivity early in the morning. The highest ranking strategy is then selected for each hour of the campaign. The selected accounts are then arrayed in accordance with the selected strategy for each hour and the optimized telephone contact campaign is generated accordingly. The appropriate dialing strategy is set for each account.

The optimized telephone contact campaign is conducted by the predictive dialer system and the operators with computer terminals. A record of each attempt and the result thereof is maintained by the predictive dialer system. These result records are used by the campaign optimizer computer system to maintain the contact histories and behavior models. Contact histories and call vectors are updated after each day's campaigns have been completed to ensure that the computations for the next day's campaigns and the performance forecasts are made using the most current data available.

After the contact phase of an optimized telephone contact campaign it is necessary to update the individual contact histories and recompute the call vectors for each telephone number. This update occurs before generating a subsequent optimized telephone contact campaign so the new information will be used in determining contact probabilities for the next campaign, particularly when aggregating contact attempts across the days of a week. The update process incorporates the standard result reporting of the predictive dialer system.

It is also necessary to periodically update behavior models 160 as the database of individual contact histories expands. Behavior models are determined using non-hierarchical cluster analysis on all of the contact histories.

FIGS. 5a–5f are database schematics showing the data record format used in the present embodiment of the invention. FIG. 5a is a database schematic showing a complete account record and the relations between telephone numbers, accounts and contact histories. Referring to FIG. 5a, Person 620 represents the individual associated with one or more accounts represented by 630. Also associated with Person 620 are call vectors, Call Likelihood 640, contact histories, Attempt History 650, corresponding to each telephone number associated with the individual, Phone 660.

FIG. 5b is a database schematic of a campaign list, showing the structure of a telephone contact campaign. FIG. 5c is a database schematic of a schedule statistics record showing the records and fields used in the performance forecasting. FIG. 5d is a database schematic of a schedule parameters record illustrating storage of campaign parameters. FIG. 5e is a database schematic of the data structures used in conjunction with the area code/time zone parameter table of campaign parameters 120. FIG. 5f is a database schematic of a credit risk parameters data structure used for initial prioritization of accounts into priority bands in a debt collections environment.

The campaign optimizer system also forecasts optimal staffing levels. If optimal staffing is determined in accordance with the maximum ratio of right party contacts per contact attempt or productivity, the "ideal" number of operators for a campaign, as opposed to the actual number of operators used when optimizing the campaign, may be forecast. Rather than prioritizing the accounts to be contacted, the optimal time interval to contact each account is determined. Then, assuming unlimited resources, a hypothetical schedule is created and the number of accounts to be contacted during each time interval is determined. Then the number of accounts is divided by the number of accounts that may be processed by each operator.

In view of the foregoing description of the invention, it will be recognized that the disclosed embodiment may be changed and modified in various ways without departing from the scope of the invention. For example, the individual contact histories may be incorporated into each account instead of being independently stored. Similarly, the campaign optimizer computer system may be integrated into the host computer system rather than utilizing separate systems. Furthermore, behavior models and other aspects of the disclosed invention may be created or assessed using alternative techniques known to those skilled in the art.

What is claimed is:

1. A method of scheduling an outbound telephone contact campaign to contact targeted individuals during the campaign using a computer system and stored accounts, each account being associated with an individual having a telephone, said method comprising the steps of:

segmenting the campaign into a plurality of time intervals;

determining a processing parameter associated with each of said accounts during each of said time intervals, said processing parameter incorporating one or more of the probability of contacting the individual associated with said account, the probability of contacting a party other than the individual associated with the account, and the expected rate of right party contact with the individual associated with the account;

determining for each of said accounts a first time period corresponding to one of said time intervals during which said processing parameter associated with said account is highest; and allocating each of said accounts to said time interval with the highest processing parameter.

2. The method according to claim 1, further comprising the step of determining a number of operators necessary in each of said time intervals to attempt to contact of said individuals allocated to be contacted during said time interval.

3. The method of claim 1, further comprising the steps of:

attempting to contact said individual associated with said account; and creating a record of attempts to contact the individual associated with each of said accounts.

4. A method using a computer system for outbound teleprocessing of a plurality of accounts, each account corresponding to an individual having a telephone, said method comprising the steps of:

maintaining a history of attempts to contact the individual corresponding to each of the accounts for teleprocessing;

determining probability of right party contact with the individual corresponding to each of said accounts during each of a plurality of time periods; and scheduling an attempt to contact the individual associated with each of said accounts during a time period on the basis of factors including said probability of right party contact with the individual corresponding to each of said accounts.

5. The method of claim 4, further comprising the steps of:

determining behavior models generally indicative of probability of contacting the individual corresponding to each of said accounts for teleprocessing for each of said plurality of time periods; and merging said behavior models and said history of attempts to contact said individual corresponding to each of said selected accounts.

6. The method of claim 4, further comprising the steps of:

determining relative teleprocessing priority of said selected accounts; and sorting said selected accounts according to said teleprocessing priority.

7. A method using a computer for allocating resources in a telephone contact campaign conducted by a plurality of telephone operators to contact a plurality of individuals, each having a telephone, said method comprising the steps of:

identifying a plurality of time intervals during which the telephone campaign is to be conducted;

determining a probability of contacting each individual during each of said time intervals;

scheduling an attempt to contact each individual during one of said time intervals on the basis of factors including said probability of contacting each individual; and determining for each of said time intervals the number of operators necessary to attempt to contact all of the individuals scheduled to be contacted during said time interval.

8. A method of generating an outbound telephone contact campaign for contacting targeted individuals, each having associated therewith an account and a telephone, said method comprising the steps of:

selecting a subset of the accounts for teleprocessing during a campaign period having a plurality of time intervals;

computing a teleprocessing capacity during each of said time intervals;

determining a probability of contact for each selected account during each of said time intervals;

determining a processing parameter for each selected account during each of said time intervals, said processing parameter depending at least in part on said probability of contact; and allocating a calling order of said subset of accounts according to said processing parameter.

9. A method of generating an outbound telephone contact campaign for contacting targeted individuals having respective accounts and telephones, said method comprising the steps of:

selecting a subset of the accounts for teleprocessing during a plurality of time intervals;

creating a record of contact attempts for each individual associated with each selected account;

determining demographic profiles for each individual associated with each selected account; and determining probabilities of right party contact for each individual associated with each selected account according to said record of contact attempts and said demographic profiles.

10. A method using a computer system for scheduling a telephone contact campaign from a plurality of stored accounts, each account corresponding to an individual having a telephone, said method comprising the steps of:

maintaining a history of attempts to contact the individual corresponding to each of the accounts for teleprocessing;

determining a probability of right party contact with the individual corresponding to each of said selected accounts during each of a plurality of time periods, said probabilities being different between at least two of said time periods;

determining a teleprocessing priority on the basis of factors including said probability of right party contact;

determining available teleprocessing capacity during each of said time periods;

sorting said accounts according to said teleprocessing priority; and scheduling each of said accounts to one of said time periods according to said teleprocessing priority during which teleprocessing capacity is available.

11. A method using a computer system for outbound teleprocessing of a plurality of stored accounts, each account corresponding to an individual having a telephone, said method comprising the steps of:

selecting from the stored accounts a subset of selected accounts for teleprocessing during a plurality of time intervals;

determining teleprocessing capacity during each time interval;

determining a first one of the plurality of time intervals for each selected account during which a processing parameter is highest, said processing parameter being determined on the basis of factors including a probability of contacting the individual associated with said selected account at said time interval;

allocating each selected account in order of said processing parameter to said respective first time interval if teleprocessing capacity is available during said first time interval.

12. The method according to claim 11, further comprising the steps of:

determining a second one of said plurality of time intervals for each selected account during which said processing parameter is next highest; and allocating each account to the respective second time interval if teleprocessing capacity is not available during the respective first time interval.

* * * * *

UNITED STATES PATENT AND TRADEMARK OFFICE
CERTIFICATE OF CORRECTION

PATENT NO. : 5,889,799
DATED : March 30, 1996
INVENTOR(S) : Harry GROSSMAN et al.

It is certified that error appears in the above-indentified patent and that said Letters Patent is hereby corrected as shown below:

Column 13, line 49, change "medium" to --median--.

Column 14, line 54, change "$R_{ge}$" to --$R_{gc}$--.

Column 20, line 24, change "1" (first occurrence) to --I--;
  line 28, change "FROM" (first occurrence) to --FOR--; and
  line 47, change "1" (first occurrence) to --I--.

Column 21, line 23, change "CENTROID(KK,J) += KOUNT(KK,J) *" to
  --CENTROID(KK,J) = KOUNT(KK,J) *--;
  line 27, change "CENTROID(KK,J) += CENTROID(KK,J) / KOUNT(KK,J)" to
  --CENTROID(KK,J) = CENTROID(KK,J) / KOUNT(KK,J)--; and
  line 30, change "CENTROID(KK,J) = KOUNT(I,J)" to
  --CENTROID(KK,J)+PROBABILTY(I,J)--.

Column 22, line 23, change "max" (second occurrence) to --min--; and
  line 43, change "p" to --;--.

Signed and Sealed this

Thirtieth Day of November, 1999

Attest:

Q. TODD DICKINSON

Attesting Officer

Acting Commissioner of Patents and Trademarks

UNITED STATES PATENT AND TRADEMARK OFFICE
CERTIFICATE OF CORRECTION

PATENT NO. : 5,889,799
DATED : March 30, 1999
INVENTOR(S) : Harry GROSSMAN et al.

It is certified that error appears in the above-identified patent and that said Letters Patent is hereby corrected as shown below:

Column 26, line 17, delete "of" (second occurrence).

Signed and Sealed this

Eleventh Day of April, 2000

*Attest:*

Q. TODD DICKINSON

*Attesting Officer*     *Director of Patents and Trademarks*